United States Patent
Xu et al.

(10) Patent No.: US 12,427,707 B2
(45) Date of Patent: Sep. 30, 2025

(54) TWIN-SCREW EXTRUSION DEVICE AND PROCESSING METHOD THEREFOR

(71) Applicant: WUYI UNIVERSITY, Jiangmen (CN)

(72) Inventors: Baiping Xu, Jiangmen (CN); Huiwen Yu, Jiangmen (CN); Lingcao Tan, Jiangmen (CN); Shuping Xiao, Jiangmen (CN); Jiarong Huang, Jiangmen (CN); Wenhua Xu, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 90 days.

(21) Appl. No.: 18/612,339

(22) Filed: Mar. 21, 2024

(65) Prior Publication Data

US 2025/0249635 A1 Aug. 7, 2025

(30) Foreign Application Priority Data

Feb. 4, 2024 (CN) .......................... 202410159445.8

(51) Int. Cl.
*B29C 48/40* (2019.01)
*B29C 48/25* (2019.01)
*B29C 48/59* (2019.01)
*B29C 48/64* (2019.01)

(52) U.S. Cl.
CPC ........ *B29C 48/402* (2019.02); *B29C 48/2526* (2019.02); *B29C 48/59* (2019.02); *B29C 48/64* (2019.02)

(58) Field of Classification Search
CPC ... B29C 48/402; B29C 48/2526; B29C 48/59; B29C 48/64; B29C 48/405; B29C 48/802; B29C 48/832
See application file for complete search history.

(56) References Cited

U.S. PATENT DOCUMENTS

| | | | | |
|---|---|---|---|---|
| 8,393,780 B2* | 3/2013 | Wenger | ................... | B29C 48/06 366/85 |
| 2010/0052206 A1* | 3/2010 | Kerr | ........................ | B29C 48/60 264/211.11 |
| 2010/0062093 A1* | 3/2010 | Wenger | ................... | A23P 30/20 425/113 |
| 2011/0091627 A1* | 4/2011 | Wenger | ................. | B29C 48/295 366/85 |
| 2013/0059053 A1* | 3/2013 | Wenger | ................. | B29C 48/395 99/353 |

* cited by examiner

*Primary Examiner* — Nahida Sultana
(74) *Attorney, Agent, or Firm* — Vivacqua Crane, PLLC

(57) ABSTRACT

A twin-screw extrusion device is disclosed, which includes a barrel and a twin-screw mechanism, the twin-screw mechanism includes a first screw, a second screw and a drive assembly, the drive assembly includes a plurality of idler gears and two mutually engaged elliptical gears, one of the elliptical gears is fixedly connected to the first screw, the other elliptical gear synchronously rotates with one of the idler gears, the last idler gear is fixedly connected to the second screw, a rotation speed of the first screw is $\omega_1=N$, an eccentricity of each of the elliptical gears is k, $0<k<0.8$, an included angle between a connecting line of the first screw and the second screw and a long axis of each of the elliptical gears is φ, and a rotation speed of the second screw is $\omega_2$, satisfying $$\omega_2 = \frac{(1-k^2)N}{1-2k\cos\varphi+k^2}.$$

6 Claims, 11 Drawing Sheets

TWIN-SCREW EXTRUSION DEVICE AND PROCESSING METHOD THEREFOR

CROSS-REFERENCE TO RELATED APPLICATION

This application is based on and claims the benefit of priority from Chinese Patent Application No. 2024101594458, filed on 4 Feb. 2024, the entirety of which is incorporated by reference herein.

TECHNICAL FIELD

The present disclosure relates to the technical field of twin-screw extruders, and in particular, to a twin-screw extrusion device and a processing method therefor.

BACKGROUND

Twin-screw extruder is common plastic processing equipment and is mainly used to mix materials. In the existing twin-screw extruder, the twin-screws are driven generally by cylindrical gears to rotate. However, this method results in poor melting, plasticizing and mixing of materials, failing to meet production needs.

SUMMARY

The present disclosure aims to solve one of the technical problems in the related technology at least to a certain extent. Therefore, the present disclosure provides a twin-screw extrusion device, which can achieve the melting, plasticizing and mixing effects of materials and improve the production quality.

The present disclosure also provides a processing method for the twin-screw extrusion device.

According to a first aspect of embodiments of the present disclosure, provided is a twin-screw extrusion device comprising a barrel and a twin-screw mechanism; the twin-screw mechanism comprises a first screw, a second screw and a drive assembly, wherein the first screw and the second screw are both rotatably connected to the barrel, the first screw is engaged with the second screw, the drive assembly comprises a plurality of idler gears and two mutually engaged elliptical gears, one of the elliptical gears is fixedly connected to the first screw, the other elliptical gear is synchronously rotatable with one of the idler gears, the plurality of idler gears are in transmission connection, and a last one of the idler gears is fixedly connected to the second screw, so that the first screw and the second screw are rotatable in a same direction; wherein the first screw is rotatable at a constant speed, a rotation speed of the first screw is $\omega_1=N$, an eccentricity of each of the elliptical gears is k, $0<k<0.8$, an included angle between a connecting line of the first screw and the second screw and a long axis of each of the elliptical gears is q, and a rotation speed of the second screw is $\omega_2$, satisfying $$\omega_2 = \frac{(1-k^2)N}{1 - 2k\cos\varphi + k^2}.$$

The twin-screw extrusion device provided by the embodiments of the present disclosure at least has the following beneficial effects. The first screw and the second screw are both rotatably connected to the barrel and are engaged with each other, one of the elliptical gears is fixedly connected to the first screw, the other elliptical gear rotates synchronously with one of the idler gears, the plurality of idler gears are in transmission connection, the last idler gear is fixedly connected to the second screw, and the elliptical gear connected to the first screw is driven to rotate, so that the first screw rotates at a constant speed, and a rotation speed of the second screw changes periodically over time. The rotation speed of the first screw is set to be $\omega_1=N$, the eccentricity of each of the elliptical gears is set to be k, $0\leq k<0.8$, the included angle between the connecting line of the first screw and the second screw and the long axis of each of the elliptical gears is set to be $\varphi$, $0\leq\varphi\leq 360°$, and the rotation speed of the second screw is set to be $\omega_2$, satisfying $$\omega_2 = \frac{(1-k^2)N}{1 - 2k\cos\varphi + k^2},$$

so that the screw channel volume between the first screw and the second screw undergoes periodic transient disturbances and the processed material interface undergoes reorientation and stretching, enhancing the melting, mixing and exhausting efficiency, accelerating the melting process of the materials, improving the melting, plasticizing and mixing effects of the materials, and improving the production quality.

According to some embodiments of the present disclosure, an outer diameter of the first screw and the second screw is D, an outer radius of the first screw and the second screw is R, an inner diameter of the first screw and the second screw is d, and an inner radius of the first screw and the second screw is r;

a center distance between the first screw and the second screw is C, and $$C = R + r = \frac{(D+d)}{2};$$

an engaged angle of the first screw and the second screw is $\beta$, and $$\beta = \arccos\left(\frac{C}{D}\right);$$

a section of the first screw is formed by connecting curve arcs $S_{12}$, $S_{23}$, $S_{34}$, $S_{45}$, $S_{56}$, $S_{67}$, $S_{78}$, $S_{89}$ and $S_{91}$, and corresponding central angles are $\varphi_1$, $\varphi_2+\beta$, $\varphi_3$, $\varphi_4+\beta$, $\varphi_5$, $\varphi_6+\beta$, $\varphi_7$, $\varphi_8+\beta$ and $\varphi_9$; a section of the second screw is formed by S'$_{12}$, S'$_{23}$, S'$_{34}$, S'$_{45}$, S'$_{56}$, S'$_{67}$, S'$_{78}$, S'$_{89}$ and S'$_{91}$, corresponding central angels are $\varphi'_1$, $\varphi'_2+\beta$, $\varphi'_3$, $\varphi'_4+\beta$, $\varphi'_5$, $\varphi'_6+\beta$, $\varphi'_7$, $\varphi'_{83}+\beta$ and $\varphi'_9$, a rotation center of the first screw is O, and a rotation center of the second screw is O';

$S_{12}$, $S_{56}$ and $S_{91}$ are a root circle arc with O as a circle center and r as a radius; $S_{34}$ and $S_{78}$ are a top circle arc with O as a circle center and r as a radius; S'$_{12}$, S'$_{56}$ and S'$_{91}$ are a top circle arc with O' as a circle center and R as a radius; S'$_{34}$ and S'$_{78}$ are a root circle arc with O' as a circle center and r as a radius;

an initial phase angle is $\theta_0$, $0\leq\theta_0\leq 360°$, and $K_d=(1+k)/(1-k)$;

the central angels satisfy:

$$\varphi_1' = 2a\tan\left(K_d\tan\left(\frac{\varphi_1 - \theta_0}{2}\right)\right) + 2a\tan\left(K_d\tan\left(\frac{\theta_0}{2}\right)\right);$$

$$\varphi_1' + \beta = 2a\tan\left(K_d\tan\left(\frac{\varphi_1 + \varphi_2 - \theta_0}{2}\right)\right) + 2a\tan\left(K_d\tan\left(\frac{\theta_0}{2}\right)\right);$$

$$\varphi_1' + \beta + \varphi_2' = 2a\tan\left(K_d\tan\left(\frac{\varphi_1 + \varphi_2 + \beta - \theta_0}{2}\right)\right) + 2a\tan\left(K_d\tan\left(\frac{\theta_0}{2}\right)\right);$$

$$\varphi_1' + \beta + \varphi_2' + \varphi_3' =$$
$$2a\tan\left(K_d\tan\left(\frac{\varphi_1 + \varphi_2 + \beta + \varphi_3 - \theta_0}{2}\right)\right) + 2a\tan\left(K_d\tan\left(\frac{\theta_0}{2}\right)\right);$$

$$\varphi_1' + \beta + \varphi_2' + \varphi_3' + \varphi_4' =$$
$$2a\tan\left(K_d\tan\left(\frac{\varphi_1 + \varphi_2 + 2\beta + \varphi_3 - \theta_0}{2}\right)\right) + 2a\tan\left(K_d\tan\left(\frac{\theta_0}{2}\right)\right);$$

$$\varphi_1' + 2\beta + \varphi_2' + \varphi_3' + \varphi_4' =$$
$$2a\tan\left(K_d\tan\left(\frac{\varphi_1 + \varphi_2 + 2\beta + \varphi_3 + \varphi_4 - \theta_0}{2}\right)\right) + 2a\tan\left(K_d\tan\left(\frac{\theta_0}{2}\right)\right);$$

$$\varphi_1' + 2\beta + \varphi_2' + \varphi_3' + \varphi_4' + \varphi_5' =$$
$$2a\tan\left(K_d\tan\left(\frac{\varphi_1 + \varphi_2 + 2\beta + \varphi_3 + \varphi_4 + \varphi_5 - \theta_0}{2}\right)\right) + 2a\tan\left(K_d\tan\left(\frac{\theta_0}{2}\right)\right);$$

$$\varphi_1' + 3\beta + \varphi_2' + \varphi_3' + \varphi_4' + \varphi_5' =$$
$$2a\tan\left(K_d\tan\left(\frac{\varphi_1 + \varphi_2 + 2\beta + \varphi_3 + \varphi_4 + \varphi_5 + \varphi_6 - \theta_0}{2}\right)\right) + 2a\tan\left(K_d\tan\left(\frac{\theta_0}{2}\right)\right);$$

$$\varphi_1' + 3\beta + \varphi_2' + \varphi_3' + \varphi_4' + \varphi_5' + \varphi_6' =$$
$$2a\tan\left(K_d\tan\left(\frac{\varphi_1 + \varphi_2 + 3\beta + \varphi_3 + \varphi_4 + \varphi_5 + \varphi_6 - \theta_0}{2}\right)\right) + 2a\tan\left(K_d\tan\left(\frac{\theta_0}{2}\right)\right);$$

$$\varphi_1' + 3\beta + \varphi_2' + \varphi_3' + \varphi_4' + \varphi_5' + \varphi_6' + \varphi_7' =$$
$$2a\tan\left(K_d\tan\left(\frac{\varphi_1 + \varphi_2 + 3\beta + \varphi_3 + \varphi_4 + \varphi_5 + \varphi_6 + \varphi_7 - \theta_0}{2}\right)\right) +$$
$$2a\tan\left(K_d\tan\left(\frac{\theta_0}{2}\right)\right);$$

$$\varphi_1' + 3\beta + \varphi_2' + \varphi_3' + \varphi_4' + \varphi_5' + \varphi_6' + \varphi_7' + \varphi_8' =$$
$$2a\tan\left(K_d\tan\left(\frac{\varphi_1 + \varphi_2 + 4\beta + \varphi_3 + \varphi_4 + \varphi_5 + \varphi_6 + \varphi_7 - \theta_0}{2}\right)\right) +$$
$$2a\tan\left(K_d\tan\left(\frac{\theta_0}{2}\right)\right);$$

$$\varphi_1' + 4\beta + \varphi_2' + \varphi_3' + \varphi_4' + \varphi_5' + \varphi_6' + \varphi_7' + \varphi_8' =$$
$$2a\tan\left(K_d\tan\left(\frac{\varphi_1 + \varphi_2 + 4\beta + \varphi_3 + \varphi_4 + \varphi_5 + \varphi_6 + \varphi_7 + \varphi_8 - \theta_0}{2}\right)\right) +$$
$$2a\tan\left(K_d\tan\left(\frac{\theta_0}{2}\right)\right);$$

$$\varphi_1' + 4\beta + \varphi_2' + \varphi_3' + \varphi_4' + \varphi_5' + \varphi_6' + \varphi_7' + \varphi_8' + \varphi_9' =$$
$$2a\tan\left(K_d\tan\left(\frac{\varphi_1 + \varphi_2 + 4\beta + \varphi_3 + \varphi_4 + \varphi_5 + \varphi_6 + \varphi_7 + \varphi_8 + \varphi_9 - \theta_0}{2}\right)\right) +$$
$$2a\tan\left(K_d\tan\left(\frac{\theta_0}{2}\right)\right);$$

$$\sum_{i=1}^{9} \varphi_i + 4\beta = 360;$$

$$\sum_{i=1}^{9} \varphi_i' + 4\beta = 360.$$

According to some embodiments of the present disclosure, connection points between every two adjacent curve arcs of the first screw are $M_1$, $M_2$, $M_3$, $M_4$, $M_5$, $M_6$, $M_7$, $M_8$ and $M_9$, which respectively correspond to curve arcs $S_{12}$, $S_{23}$, $S_{34}$, $S_{45}$, $S_{56}$, $S_{67}$, $S_{78}$, $S_{89}$ and $S_{91}$, and an auxiliary angle is given as $\theta$, $0 \leq \theta \leq \beta$;

$OM_2$ is taken as a polar axis, a polar diameter corresponding to any position of the curve arc $S_{23}$ is $OP_2 = \rho_2(\theta)$, and an included angle between the polar diameter $OP_2$ and the polar axis $OM_2$ is a polar angle $\varepsilon_2(\theta)$, which satisfies:

$$\varepsilon_2(\theta) = 2\arctan\left[\tan\left(\frac{\varphi_1' + \theta}{2} - a\tan\left(K_d\tan\left(\frac{\theta_0}{2}\right)\right)\right)/K_d\right] +$$
$$\theta_0 - \varphi_1 + \arctan\left(\frac{R\sin\theta}{C - R\cos\theta}\right);$$

$$\rho_2(\theta) = \sqrt{C^2 + R^2 - 2CR\cos\theta};$$

$OM_5$ is taken as a polar axis, a polar diameter corresponding to any position of the curve arc $S_{45}$ is $OP_5 = \rho_4(\theta)$, and an included angle between the polar diameter $OP_5$ and the polar axis $OM_5$ is a polar angle $\varepsilon_4(\theta)$, which satisfies:

$$\varepsilon_4(\theta) = \varphi_1 + \varphi_2 + \varphi_3 + \varphi_4 + 2\beta - \theta_0 -$$
$$2\arctan\left[\tan\left(\frac{\varphi_1' + \beta + \varphi_2' + \varphi_3' + \varphi_4' + \theta}{2} - a\tan\left(K_d\tan\left(\frac{\theta_0}{2}\right)\right)\right)/K_d\right] +$$
$$\arctan\left(\frac{R\sin(\beta - \theta)}{C - R\cos(\beta - \theta)}\right);$$

$$\rho_4(\theta) = \sqrt{C^2 + R^2 - 2CR\cos(\beta - \theta)};$$

$OM_6$ is taken as a polar axis, a polar diameter corresponding to any position of the curve arc $S_{67}$ is $OP_6 = \rho_6(\theta)$, and an included angle between the polar diameter $OP_6$ and the polar axis $OM_6$ is a polar angle $\varepsilon_6(\theta)$, which satisfies:

$$\varepsilon_6(\theta) =$$
$$2\arctan\left[\tan\left(\frac{\varphi_1' + 2\beta + \varphi_2' + \varphi_3' + \varphi_4' + \varphi_5' + \theta}{2} - a\tan\left(K_d\tan\left(\frac{\theta_0}{2}\right)\right)\right)/K_d\right] +$$
$$\theta_0 - \varphi_1 - \varphi_2 - \varphi_3 - \varphi_4 - \varphi_5 - 2\beta + \arctan\left(\frac{R\sin\theta}{C - R\cos\theta}\right);$$

$$\rho_6(\theta) = \sqrt{C^2 + R^2 - 2CR\cos\theta};$$

$OM_9$ is taken as a polar axis, a polar diameter corresponding to any position of the curve arc $S_{89}$ is $OP_8 = \rho_8(\theta)$, and an included angle between the polar diameter $OP_8$ and the polar axis $OM_9$ is a polar angle $\varepsilon_3(\theta)$, which satisfies:

$$\varepsilon_8(\theta) = \varphi_1 + 4\beta + \varphi_2 + \varphi_3 + \varphi_4 + \varphi_5 + \varphi_6 + \varphi_7 + \varphi_8 - \theta_0 -$$
$$2\arctan\left[\tan\left(\frac{\varphi_1' + 3\beta + \varphi_2' + \varphi_3' + \varphi_4' + \varphi_5' + \varphi_6' + \varphi_7' + \varphi_8' + \theta}{2} -\right.\right.$$
$$\left.\left. a\tan\left(K_d\tan\left(\frac{\theta_0}{2}\right)\right)\right)/K_d\right] + \arctan\left(\frac{R\sin(\beta - \theta)}{C - R\cos(\beta - \theta)}\right);$$

$$\rho_8(\theta) = \sqrt{C^2 + R^2 - 2CR\cos(\beta - \theta)}.$$

According to some embodiments of the present disclosure, connection points between every two adjacent curve arcs of the second screw are $N_1$, $N_2$, $N_3$, $N_4$, $N_5$, $N_6$, $N_7$, $N_8$ and $N_9$, which respectively correspond to curve arcs $S'_{12}$, $S'_{23}$, $S'_{34}$, $S'_{45}$, $S'_{56}$, $S'_{67}$, $S'_{78}$, $S'_{89}$ and $S'_{91}$, and an auxiliary angle is given as $\theta$, $0 \le \theta \le \beta$;

$O'N_3$ is taken as a polar axis, a polar diameter corresponding to any position of the curve arc $S'_{23}$ is $OP_{2'} = \rho_{2'}(\theta)$, and an included angle between the polar diameter $OP_{2'}$ and the polar axis $ON_3$ is a polar angle $\varepsilon_{2'}(\theta)$, which satisfies:

$$\varepsilon_{2'}(\theta) =$$
$$\varphi'_1 + \beta + \varphi'_2 - 2a\tan\left[K_d\tan\left(\frac{\varphi_1 + \varphi_2 + \theta - \theta_0}{2}\right)\right] - 2a\tan\left(K_d\tan\left(\frac{\theta_0}{2}\right)\right) +$$
$$\arctan\left(\frac{R\sin(\beta - \theta)}{C - R\cos(\beta - \theta)}\right);$$
$$\rho_{2'}(\theta) = \sqrt{C^2 + R^2 - 2CR\cos(\beta - \theta)},$$

$O'N_4$ is taken as a polar axis, a polar diameter corresponding to any position of the curve arc $S'_{45}$ is $OP_{4'} = \rho_{4'}(\theta)$, and an included angle between the polar diameter $OP_{4'}$ and the polar axis $ON_4$ is a polar angle $\varepsilon_{4'}(\theta)$, which satisfies:

$$\varepsilon_{4'}(\theta) = 2a\tan\left(K_d\tan\left(\frac{\varphi_1 + \varphi_2 + \beta + \varphi_3 + \theta - \theta_0}{2}\right)\right) +$$
$$2a\tan\left(K_d\tan\left(\frac{\theta_0}{2}\right)\right) - \varphi'_1 - \beta - \varphi'_2 - \varphi'_3 + \arctan\left(\frac{R\sin\theta}{C - R\cos\theta}\right);$$
$$\rho_{4'}(\theta) = \sqrt{C^2 + R^2 - 2CR\cos\theta};$$

$O'N_6$ is taken as a polar axis, a polar diameter corresponding to any position of the curve arc $S'_{67}$ is $OP_{6'} = \rho_{6'}(\theta)$, and an included angle between the polar diameter $OP_{6'}$ and the polar axis $ON_6$ is a polar angle $\varepsilon_{6'}(\theta)$, which satisfies:

$$\varepsilon_{6'}(\theta) = \varphi'_1 + 3\beta \varphi'_2 + \varphi'_3 + \varphi'_4 + \varphi'_5 + \varphi'_6 -$$
$$2a\tan\left(K_d\tan\left(\frac{\varphi_1 + 2\beta + \varphi_2 + \varphi_3 + \varphi_4 + \varphi_5 + \varphi_6 + \theta - \theta_0}{2}\right)\right) -$$
$$2a\tan\left(K_d\tan\left(\frac{\theta_0}{2}\right)\right) + \arctan\left(\frac{R\sin(\beta - \theta)}{C - R\cos(\beta - \theta)}\right);$$
$$\rho_{6'}(\theta) = \sqrt{C^2 + R^2 - 2CR\cos(\beta - \theta)};$$

$O'N_8$ is taken as a polar axis, a polar diameter corresponding to any position of the curve arc $S'_{89}$ is $OP_{8'} = \rho_{8'}(\theta)$, and an included angle between the polar diameter $OP_{8'}$ and the polar axis $ON_7$ is a polar angle $\varepsilon_{8'}(\theta)$, which satisfies:

$$\varepsilon_{8'}(\theta) = 2a\tan\left(K_d\tan\frac{\varphi_1 + 3\beta + \varphi_2 + \varphi_3 + \varphi_4 + \varphi_5 + \varphi_6 + \varphi_7 + \theta - \theta_0}{2}\right) +$$
$$2a\tan\left(K_d\tan\left(\frac{\theta_0}{2}\right)\right) - \varphi'_1 - \varphi'_2 - \varphi'_3 - \varphi'_4 -$$
$$\varphi'_5 - \varphi'_6 - \varphi'_7 - 3\beta + \arctan\left(\frac{R\sin\theta}{C - R\cos\theta}\right);$$

-continued
$$\rho_{8'}(\theta) = \sqrt{C^2 + R^2 - 2CR\cos\theta}.$$

According to some embodiments of the present disclosure, along an axial direction of the first screw, the barrel is sequentially provided with a conveying section, a melting section, an exhaust section and a mixing extrusion section, wherein the conveying section is provided with a feed inlet, the exhaust section is provided with an exhaust outlet, and the mixing extrusion section is provided with a discharge outlet.

According to some embodiments of the present disclosure, both an outer diameter of the first screw and an outer diameter of the second screw are tangent to an inner wall of the barrel.

According to a second aspect of embodiments of the present disclosure, provided is a processing method for a twin-screw extrusion device comprising the twin-screw extrusion device according to an embodiment of a first aspect of embodiments of the present disclosure, wherein the processing method comprises:

step S100: adding materials;
step S200: rotating the first screw and the second screw in the same direction, rotating the first screw at a constant speed, wherein the rotation speed of the second screw periodically changes over time, and the first screw and the second screw cooperate to convey the materials;
step S300: melting the materials by external heating and the heat generated by the rotation of the first screw and the second screw, so that the materials form a melt; and
step S400: extruding and stretching by cooperation of the barrel, the first screw and the second screw cooperate the materials, and driving the materials to be extruded and molded from the discharge outlet.

The processing method for the twin-screw extrusion device according to the embodiment of the present disclosure at least has the following beneficial effects. By arranging the twin-screw extrusion device according to embodiments of the first aspect of the present disclosure, and by introducing the extrusion and stretching effects of compression and expansion and re-compression and re-expansion generated by a flow channel, the periodic transient disturbance of a velocity field and the stretching and re-orientation effects in the material mixing and dispersing process, the melting and mixing effect and devolatilization efficiency are enhanced, and combined with the periodic pulsation effect, the self-cleaning effect is more effectively achieved.

Additional aspects and advantages of the present disclosure will be set forth in part in the following description, some of which will be apparent from the following description, or will be learned by practice of the present disclosure.

BRIEF DESCRIPTION OF DRAWINGS

The above and/or additional aspects and advantages of the present disclosure will become apparent and readily appreciated from the following description of the embodiments with reference to the accompanying drawings. In the drawings.

DESCRIPTIONS OF REFERENCE NUMERALS

Figure 1:
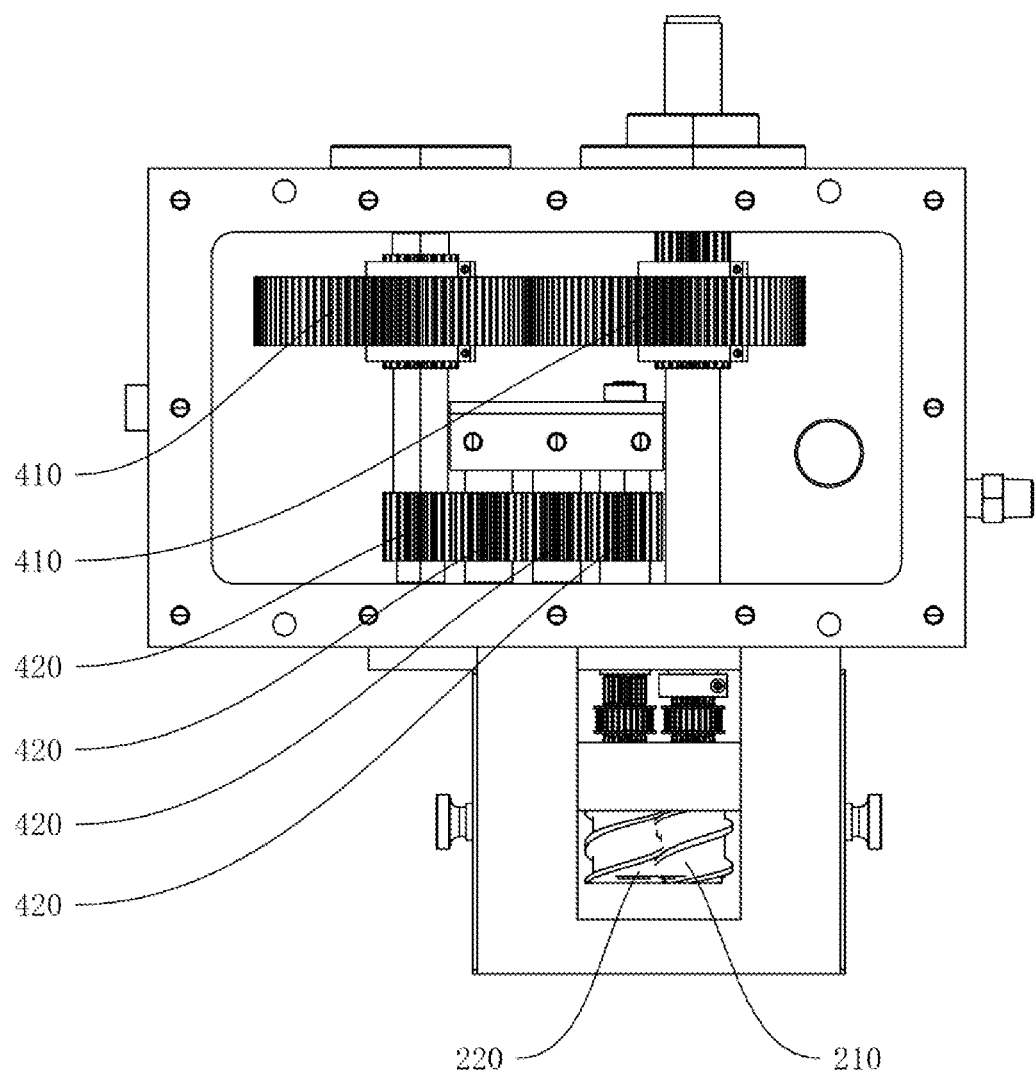
FIG. 1 is a schematic diagram of assembly of a drive assembly and a twin-screw extrusion device according to an embodiment of a first aspect of the present disclosure

100: barrel, 110: conveying section, 111: feed inlet, 120: melting section, 130: exhaust section, 131: exhaust outlet, 140: mixing extrusion section, and 141: discharge outlet;

200: twin-screw mechanism, 210: first screw, and 220: second screw;

300: flow channel; and

410: elliptical gear, 420: idler gear.

DETAILED DESCRIPTION

Embodiments of the present disclosure will be described in detail below, and examples of the embodiments are shown in the accompanying drawings, wherein the same or similar reference numerals indicate the same or similar elements or elements having the same or similar functions throughout. The embodiments described below with reference to the accompanying drawings are illustrative only for the purpose of explaining the present disclosure, and are not to be construed as limiting the present disclosure.

In the description of the present disclosure, it should be understood that directions or positional relationships indicated by terms such as "upper", "lower", "front", "rear", "left", "right" and the like are those shown based on the accompanying drawings, and are merely intended to facilitate and simplify the description of the present disclosure, rather than indicate or imply that the indicated apparatus or element must have a specific direction and must be configured and operated according to the specific direction. Therefore, these directions or positional relationships should not be construed as limiting the present disclosure.

In the description of the present disclosure, "several" means one or more, "a plurality of" means two or more, "greater than", "less than", "more than" and the like are understood as excluding the following number, and "above", "below", "within" and the like are understood as including the following number. The description of "first" and "second" is merely for the purpose of distinguishing technical features, but shall not be understood as an indication or implication of relative importance, or an implicit indication of a quantity of indicated technical features, or an implicit indication of the sequence of the indicated technical features.

In the description of the present disclosure, unless otherwise explicitly defined, terms such as "arrange", "mount", "connect" and the like should be understood in a broad sense, and those of ordinary skills in the art can reasonably determine the specific meanings of the above terms in the present disclosure in conjunction with the specific contents of the technical solutions.

It may be understood that, referring to FIGS. 1 to 6 and FIG. 9, a twin-screw extrusion device according to an embodiment of a first aspect of the present disclosure comprises a barrel 100 and a twin-screw mechanism 200. The twin-screw mechanism 200 comprises a first screw 210, a second screw 220 and a drive assembly. The first screw 210 and the second screw 220 are both rotatably connected to the barrel 100, the first screw 210 is engaged with the second screw 220. The drive assembly comprises a plurality of idler gears 420 and two mutually engaged elliptical gears 410, one of the elliptical gears 410 is fixedly connected to the first screw 210, the other elliptical gear 410 synchronously rotates with one of the idler gears 420, the plurality of idler gears 420 are in transmission connection, and the last idler gear 420 is fixedly connected to the second screw 220, so that the first screw 210 and the second screw 220 rotate in the same direction. The first screw 210 rotates at a constant speed, a rotation speed of the first screw 210 is $\omega_1=N$, an eccentricity of each of the elliptical gears 410 is k, 0<k<0.8, an included angle between a connecting line of the first screw 210 and the second screw 220 and a long axis of each of the elliptical gears 410 is φ, and a rotation speed of the second screw 220 is $\omega_2$, satisfying $$\omega_2 = \frac{(1-k^2)N}{1-2k\cos\varphi + k^2}.$$

The first screw 210 and the second screw 220 are both rotatably connected to the barrel 100, the first screw 210 and the second screw 220 are engaged with each other, one of the elliptical gears 410 is fixedly connected to the first screw 210, the other elliptical gear 410 rotates synchronously with one of the idler gears 420, the plurality of idler gears 420 are in transmission connection, the last idler gear 420 is fixedly connected to the second screw 220, and the elliptical gear 410 connected to the first screw 210 is driven to rotate to drive the idler gear 420 to rotate, thereby driving another elliptical gear 410 to rotate, so that the first screw 210 rotates at a constant speed, and a rotation speed of the second screw 220 changes periodically over time. The rotation speed of the first screw 210 is set to be $\omega_1 = N$, the eccentricity of each of the elliptical gears 410 is set to be k, 0<k<0.8, the included angle between the connecting line of the first screw 210 and the second screw 220 and the long axis of each of the elliptical gears 410 is set to be $\varphi$, $0 \leq \varphi \leq 360°$, and the rotation speed of the second screw 220 is set to be $\omega_2$, satisfying $$\omega_2 = \frac{(1-k^2)N}{1 - 2k\cos\varphi + k^2},$$

so that a screw channel volume between the first screw 210 and the second screw 220 undergoes periodic compression and expansion, the velocity field undergoes periodic transient disturbances and the processed material interface undergoes reorientation and stretching, enhancing the melting, mixing and exhausting efficiency, accelerating the melting process of the materials, improving the melting, plasticizing and mixing effects of the materials, and improving the production quality.

It should be noted that a transmission ratio between the first screw 210 and the second screw 220 is $$\frac{\omega_1}{\omega_2} = \frac{1 - 2k\cos\varphi + k^2}{1 - k^2},$$

that is, the rotation speed of the second screw 220 changes with the rotation angle of the first screw 210, so that a shearing force and a friction force applied to the materials between the first screw 210 and the second screw 220 can be changed periodically, the dispersion and mixing capability of the materials is improved, and the production quality is improved.

The idler gears 420 are in transmission connection, two adjacent idler gears 420 can be engaged or can also rotate coaxially, the last idler gear 420 refers to the last idler gear 420 in a plurality of idler gear transmission chains, and a rotation direction of the last idler gear 420 is the same as that of the first screw 210. The number of teeth of the two elliptical gears 410 is equal, so that the rotation speed of the second screw 220 can periodically change over time, thereby improving the mixing efficiency of the materials. In addition, the elliptical gears 410 can be driven by an electric motor, a pneumatic motor and a hydraulic motor. Details are not described herein again.

Figure 9:
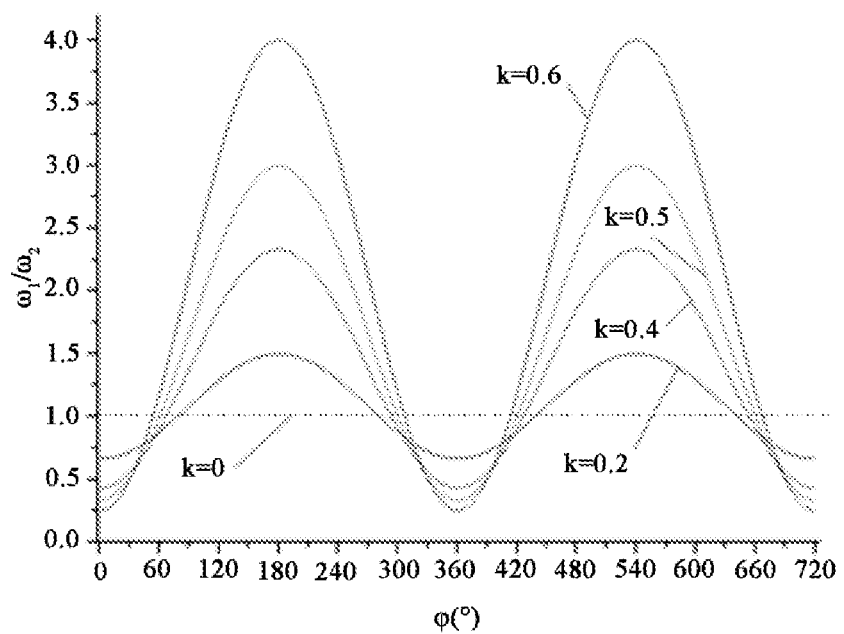
FIG. 9 is a schematic diagram of an eccentricity of an elliptical gear and an instantaneous transmission ratio of a first screw and a second screw of a twin-screw extrusion device according to an embodiment of a first aspect of the present disclosure.
Figure 10:
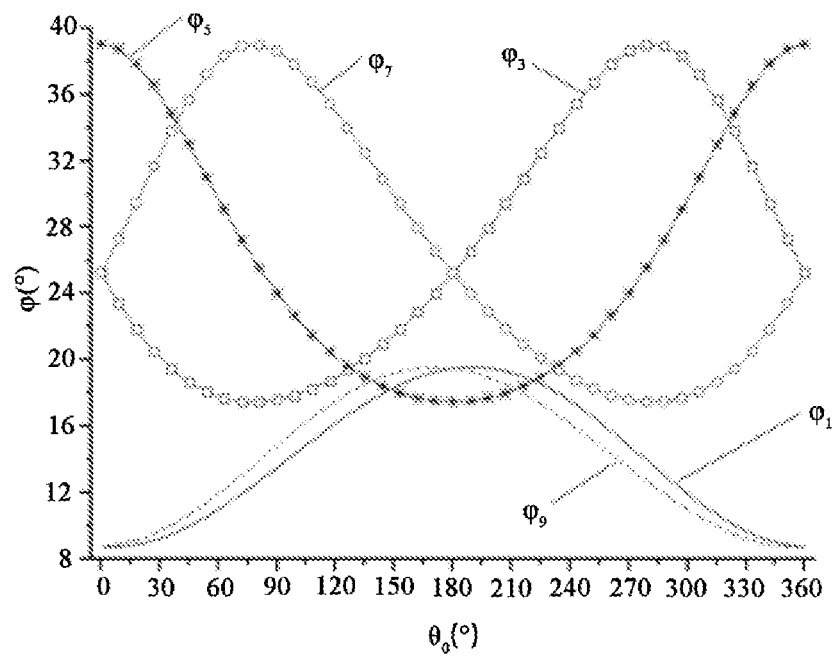
FIG. 10 is a schematic diagram of central angles of top and root circles of a cross-section of a first screw with different phase angles $\theta_0$ according to an embodiment of a first aspect of the present disclosure when k=0.2.
Figure 11:
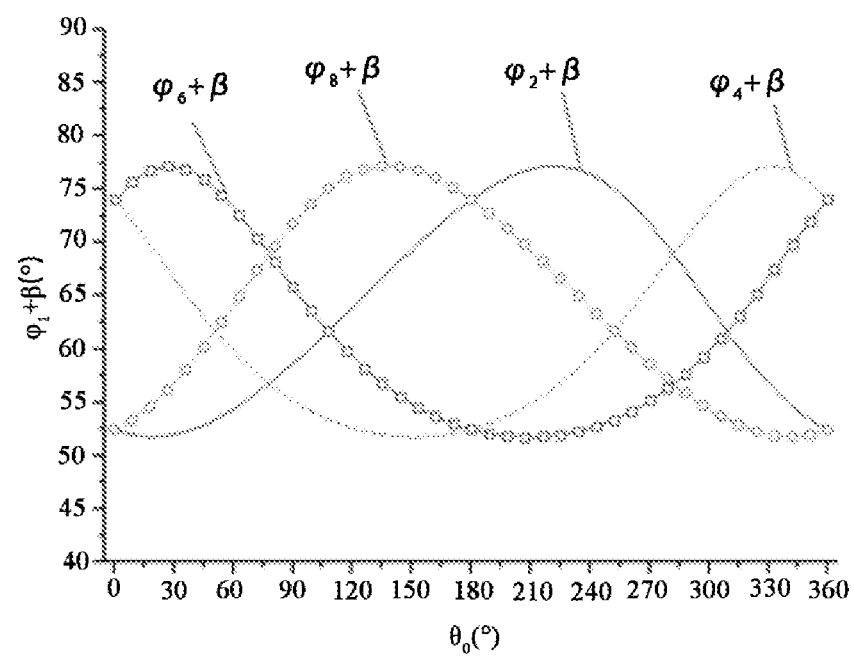
FIG. 11 is a schematic diagram of central angles corresponding to curve arcs $S_{23}$, $S_{45}$, $S_{67}$ and $S_{89}$ of a cross-section of a first screw with different phase angles $\theta_0$ according to an embodiment of a first aspect of the present disclosure when k=0.2.
Figure 12:
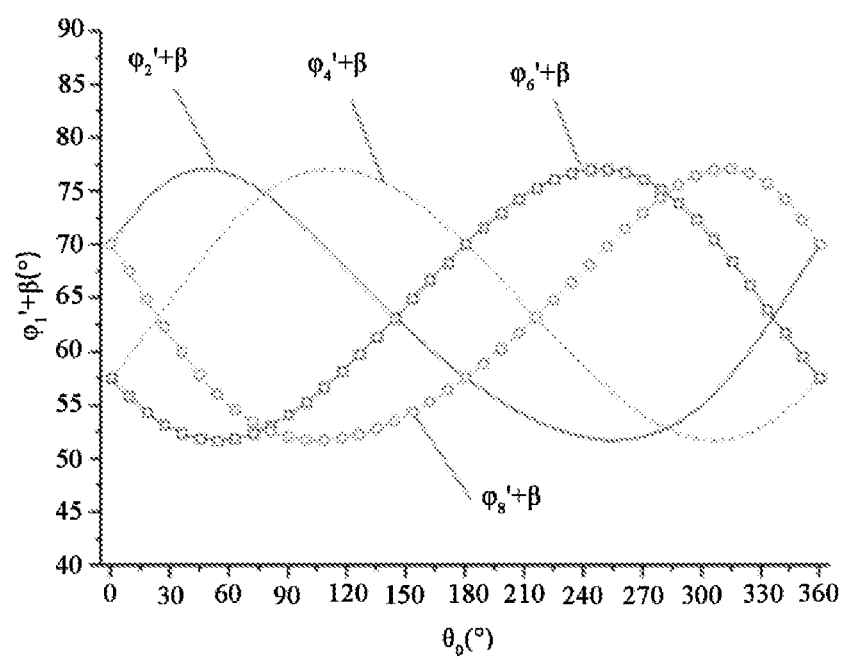
FIG. 12 is a schematic diagram of central angles corresponding to curve arcs $S'_{23}$, $S'_{45}$, $S'_{67}$ and $S'_{89}$ of a cross-section of a second screw with different phase angles $\theta_0$ according to an embodiment of a first aspect of the present disclosure when k=0.2.

Further, referring to FIG. 9, the larger the eccentricity k of the elliptical gear, the larger the amplitude of the transmission ratio between the first screw 210 and the second screw 220, that is, the eccentricity k of the elliptical gear 410 is proportional to the amplitude of the transmission ratio between the first screw 210 and the second screw 220.

Specifically, referring to FIGS. 4 to 12, an outer diameter of the first screw 210 and the second screw 220 is D, an outer radius of the first screw 210 and the second screw 220 is R, an inner diameter of the first screw 210 and the second screw 220 is d, and an inner radius of the first screw 210 and the second screw 220 is r;

a center distance between the first screw 210 and the second screw 220 is C, and $$C = R + r = \frac{(D+d)}{2};$$

an engaged angle of the first screw 210 and the second screw 220 is $\beta$, and $$\beta = \arccos\left(\frac{c}{D}\right);$$

a section of the first screw 210 is formed by connecting curve arcs $S_{12}$, $S_{23}$, $S_{34}$, $S_{45}$, $S_{56}$, $S_{67}$, $S_{78}$, $S_{89}$ and $S_{91}$, and corresponding central angles are $\varphi_1$, $\varphi_2 + \beta$, $\varphi_3$, $\varphi_4 + \beta$, $\varphi_5$, $\varphi_6 + \beta$, $\varphi_7$, $\varphi_8 + \beta$ and $\varphi_9$; a section of the second screw 220 is formed by $S'_{12}$, $S'_{23}$, $S'_{34}$, $S'_{45}$, $S'_{56}$, $S'_{67}$, $S'_{78}$, $S'_{89}$ and $S'_{91}$, corresponding central angels are $\varphi'_1$, $\varphi'_2 + \beta$, $\varphi'_3$, $\varphi'_4 + \beta$, $\varphi'_5$, $\varphi'_6 + \beta$, $\varphi'_7$, $\varphi'_8 + \beta$ and $\varphi'_9$, a rotation center of the first screw 210 is O, and a rotation center of the second screw 220 is O';

$S_{12}$, $S_{56}$ and $S_{91}$ are a root circle arc with O as a circle center and r as a radius; $S_{34}$ and $S_{78}$ are a top circle arc with O as a circle center and r as a radius; $S'_{12}$, $S'_{56}$ and $S'_{91}$ are a top circle arc with O' as a circle center and R as a radius; $S'_{34}$ and $S'_{78}$ are a root circle arc with O' as a circle center and r as a radius;

an initial phase angle is $\theta_0$, $0 \leq \theta_0 \leq 360°$, and $K_d = (1+k)/(1-k)$;

the central angels satisfy:

$$\varphi'_1 = 2a\tan\left(K_d\tan\left(\frac{\varphi_1 - \theta_0}{2}\right)\right) + 2a\tan\left(K_d\tan\left(\frac{\theta_0}{2}\right)\right);$$

$$\varphi'_1 + \beta = 2a\tan\left(K_d\tan\left(\frac{\varphi_1 + \varphi_2 - \theta_0}{2}\right)\right) + 2a\tan\left(K_d\tan\left(\frac{\theta_0}{2}\right)\right);$$

$$\varphi'_1 + \beta + \varphi'_2 = 2a\tan\left(K_d\tan\left(\frac{\varphi_1 + \varphi_2 + \beta - \theta_0}{2}\right)\right) + 2a\tan\left(K_d\tan\left(\frac{\theta_0}{2}\right)\right);$$

$$\varphi'_1 + \beta + \varphi'_2 + \varphi'_3 =$$
$$2a\tan\left(K_d\tan\left(\frac{\varphi_1 + \varphi_2 + \beta + \varphi_3 - \theta_0}{2}\right)\right) + 2a\tan\left(K_d\tan\left(\frac{\theta_0}{2}\right)\right);$$

$$\varphi'_1 + \beta + \varphi'_2 + \varphi'_3 + \varphi'_4 =$$
$$2a\tan\left(K_d\tan\left(\frac{\varphi_1 + \varphi_2 + 2\beta + \varphi_3 - \theta_0}{2}\right)\right) + 2a\tan\left(K_d\tan\left(\frac{\theta_0}{2}\right)\right);$$

$$\varphi'_1 + 2\beta + \varphi'_2 + \varphi'_3 + \varphi'_4 =$$
$$2a\tan\left(K_d\tan\left(\frac{\varphi_1 + \varphi_2 + 2\beta + \varphi_3 + \varphi_4 - \theta_0}{2}\right)\right) + 2a\tan\left(K_d\tan\left(\frac{\theta_0}{2}\right)\right);$$

$$\varphi'_1 + 2\beta + \varphi'_2 + \varphi'_3 + \varphi'_4 + \varphi'_5 =$$
$$2a\tan\left(K_d\tan\left(\frac{\varphi_1 + \varphi_2 + 2\beta + \varphi_3 + \varphi_4 + \varphi_5 - \theta_0}{2}\right)\right) + 2a\tan\left(K_d\tan\left(\frac{\theta_0}{2}\right)\right);$$

$$\varphi'_1 + 3\beta + \varphi'_2 + \varphi'_3 + \varphi'_4 + \varphi'_5 =$$
$$2a\tan\left(K_d\tan\left(\frac{\varphi_1 + \varphi_2 + 2\beta + \varphi_3 + \varphi_4 + \varphi_5 + \varphi_6 - \theta_0}{2}\right)\right) +$$
$$2a\tan\left(K_d\tan\left(\frac{\theta_0}{2}\right)\right);$$

$$\varphi'_1 + 3\beta + \varphi'_2 + \varphi'_3 + \varphi'_4 + \varphi'_5 + \varphi'_6 =$$
$$2a\tan\left(K_d\tan\left(\frac{\varphi_1 + \varphi_2 + 3\beta + \varphi_3 + \varphi_4 + \varphi_5 + \varphi_6 - \theta_0}{2}\right)\right) +$$
$$2a\tan\left(K_d\tan\left(\frac{\theta_0}{2}\right)\right);$$

-continued $$\varphi'_1 + 3\beta + \varphi'_2 + \varphi'_3 + \varphi'_4 + \varphi'_5 + \varphi'_6 + \varphi'_7 =$$
$$2a\tan\left(K_d\tan\left(\frac{\varphi_1 + \varphi_2 + 3\beta + \varphi_3 + \varphi_4 + \varphi_5 + \varphi_6 + \varphi_7 - \theta_0}{2}\right)\right) +$$
$$2a\tan\left(K_d\tan\left(\frac{\theta_0}{2}\right)\right);$$

$$\varphi'_1 + 3\beta + \varphi'_2 + \varphi'_3 + \varphi'_4 + \varphi'_5 + \varphi'_6 + \varphi'_7 + \varphi'_8 =$$
$$2a\tan\left(K_d\tan\left(\frac{\varphi_1 + \varphi_2 + 4\beta + \varphi_3 + \varphi_4 + \varphi_5 + \varphi_6 + \varphi_7 - \theta_0}{2}\right)\right) +$$
$$2a\tan\left(K_d\tan\left(\frac{\theta_0}{2}\right)\right);$$

$$\varphi'_1 + 4\beta + \varphi'_2 + \varphi'_3 + \varphi'_4 + \varphi'_5 + \varphi'_6 + \varphi'_7 + \varphi'_8 =$$
$$2a\tan\left(K_d\tan\left(\frac{\varphi_1 + \varphi_2 + 4\beta + \varphi_3 + \varphi_4 + \varphi_5 + \varphi_6 + \varphi_7 + \varphi_8 - \theta_0}{2}\right)\right) +$$
$$2a\tan\left(K_d\tan\left(\frac{\theta_0}{2}\right)\right);$$

$$\varphi'_1 + 4\beta + \varphi'_2 + \varphi'_3 + \varphi'_4 + \varphi'_5 + \varphi'_6 + \varphi'_7 + \varphi'_8 + \varphi'_9 =$$
$$2a\tan\left(K_d\tan\left(\frac{\varphi_1 + \varphi_2 + 4\beta + \varphi_3 + \varphi_4 + \varphi_5 + \varphi_6 + \varphi_7 + \varphi_8 + \varphi_9 - \theta_0}{2}\right)\right) +$$
$$2a\tan\left(K_d\tan\left(\frac{\theta_0}{2}\right)\right);$$

$$\sum_{i=1}^{9} \varphi_i + 4\beta = 360;$$

$$\sum_{i=1}^{9} \varphi'_i + 4\beta = 360.$$

By defining the structure of the curve arc of each section of the first screw 210 and the second screw 220, the first screw 210 and the second screw 220 keep engagement while rotating in the same direction, and the rotation speed ratio of the first screw 210 and the second screw 220 is periodically changed over time, so that the first screw 210 and the second screw 220 can achieve the self-cleaning effect, the materials form continuous material flow in a barrel, the detention and blockage of the materials are reduced, the adhesion of the materials between the screws and the barrel is reduced, the risks of blockage and scaling are reduced, the residence time distribution of the materials is relatively uniform, and the quality and stability of products are improved.

When the central angles corresponding to the arc segments of the second screw 220 are given, that is, appropriate values of $\varphi'_1$, $\varphi'_3$, $\varphi'_5$ and $\varphi'_7$ are given, the equations formed above can be solved to obtain the values of the central angles corresponding to the curve arcs of the first screw 210 and the remaining curve arcs of the second screw 220, that is, $\varphi'_2$, $\varphi'_4$, $\varphi'_6$, $\varphi'_8$, $\varphi'_9$, $\varphi_1$, $\varphi_2$, $\varphi_3$, $\varphi_4$, $\varphi_5$, $\varphi_6$, $\varphi_7$, $\varphi_8$ and $\varphi_9$ can all be solved. For example, when D/d=1.4 is determined, central angles of selected top and root circles of the second screw 220 are $\varphi'_1=13.076°$ and $\varphi'_3=\varphi'_5=\varphi'_7=26.152°$; and when $\theta_0=0°$, the central angles of the first screw 210 corresponding to different eccentricities k are as shown in Table 1 below:

TABLE 1

Central angle of the curve arc of each section of the first screw 210 corresponding to different eccentricities k

| k | $\varphi_1$ (°) | $\varphi_2 + \beta$ (°) | $\varphi_3$ (°) | $\varphi_4 + \beta$(°) | $\varphi_5$ (°) | $\varphi_6 + \beta$ (°) | $\varphi_7$ (°) | $\varphi_8 + \beta$ (°) |
|---|---|---|---|---|---|---|---|---|
| 0.2 | 8.738 | 52.471 | 25.253 | 74.029 | 39.017 | 74.029 | 25.253 | 52.471 |
| 0.4 | 4.310 | 44.918 | 17.508 | 90.107 | 46.314 | 90.107 | 17.508 | 44.918 |
| 0.5 | 2.490 | 41.778 | 12.121 | 101.475 | 44.270 | 101.475 | 12.121 | 41.778 |
| 0.6 | 0.985 | 39.016 | 5.919 | 118.420 | 31.321 | 118.420 | 5.919 | 39.016 |

Similarly, when $\theta_0=0°$, the central angles of the second screw 220 corresponding to different eccentricities k are as shown in Table 2 below:

TABLE 2

Central angle of the curve arc of each section of the second screw 220 corresponding to different eccentricities k

| k | $\varphi'_1$ (°) | $\varphi'_2 + \beta$ (°) | $\varphi'_3$ (°) | $\varphi'_4 + \beta$(°) | $\varphi'_5$ (°) | $\varphi'_6 + \beta$ (°) | $\varphi'_7$ (°) | $\varphi'_8 + \beta$ (°) |
|---|---|---|---|---|---|---|---|---|
| 0.2 | 13.076 | 70.087 | 26.152 | 57.610 | 26.152 | 57.610 | 26.152 | 70.087 |
| 0.4 | 10.036 | 83.783 | 20.0724 | 56.072 | 20.0724 | 56.072 | 20.0724 | 83.783 |
| 0.5 | 7.461 | 93.870 | 14.922 | 56.286 | 14.922 | 56.286 | 14.922 | 93.870 |
| 0.6 | 3.938 | 107.095 | 7.876 | 57.153 | 7.876 | 57.153 | 7.876 | 107.095 |

Specifically, referring to FIGS. 4 to 12, connection points between every two adjacent curve arcs of the first screw 210 are $M_1$, $M_2$, $M_3$, $M_4$, $M_5$, $M_6$, $M_7$, $M_8$ and $M_9$, which respectively correspond to curve arcs $S_{12}$, $S_{23}$, $S_{34}$, $S_{45}$, $S_{56}$, $S_{67}$, $S_{78}$, $S_{89}$ and $S_{91}$, and an auxiliary angle is given as $\theta$, $0 \leq \theta \leq \beta$;

$OM_2$ is taken as a polar axis, a polar diameter corresponding to any position of the curve arc $S_{23}$ is $OP_2=\rho_2(\theta)$, and an included angle between the polar diameter $OP_2$ and the polar axis $OM_2$ is a polar angle $\varepsilon_2(\theta)$, which satisfies:

$$\varepsilon_2(\theta) = 2\arctan$$

$$\left[\tan\left(\frac{\varphi'_1+\theta}{2} - a\tan\left(K_d\tan\left(\frac{\theta_0}{2}\right)\right)\right)/K_d\right] + \theta_0 - \varphi_1 + \arctan\left(\frac{R\sin\theta}{C-R\cos\theta}\right);$$

$$\rho_2(\theta) = \sqrt{C^2 + R^2 - 2CR\cos\theta};$$

$OM_5$ is taken as a polar axis, a polar diameter corresponding to any position of the curve arc $S_{45}$ is $OP_5 = \rho_4(\theta)$, and an included angle between the polar diameter $OP_5$ and the polar axis $OM_5$ is a polar angle $\varepsilon_4(\theta)$, which satisfies:

$$\varepsilon_4(\theta) = \varphi_1 + \varphi_2 + \varphi_3 + \varphi_4 + 2\beta - \theta_0 -$$

$$2\arctan\left[\tan\left(\frac{\varphi'_1+\beta+\varphi'_2+\varphi'_3+\varphi'_4+\theta_0}{2} - a\tan\left(K_d\tan\left(\frac{\theta_0}{2}\right)\right)\right)/K_d\right] +$$

$$\arctan\left(\frac{R\sin(\beta-\theta)}{C-R\cos(\beta-\theta)}\right);$$

$$\rho_4(\theta) = \sqrt{C^2 + R^2 - 2CR\cos(\beta-\theta)};$$

$OM_6$ is taken as a polar axis, a polar diameter corresponding to any position of the curve arc $S_{67}$ is $OP_6 = \rho_6(\theta)$, and an included angle between the polar diameter $OP_6$ and the polar axis $OM_6$ is a polar angle $\varepsilon_6(\theta)$, which satisfies:

$$\varepsilon_6(\theta) =$$

$$2\arctan\left[\tan\left(\frac{\varphi'_1+2\beta+\varphi'_2+\varphi'_3+\varphi'_4+\varphi'_5+\theta}{2} - a\tan\left(K_d\tan\left(\frac{\theta_0}{2}\right)\right)\right)/K_d\right] +$$

$$\theta_0 - \varphi_1 - \varphi_2 - \varphi_3 - \varphi_4 - \varphi_5 - 2\beta + \arctan\left(\frac{R\sin\theta}{C-R\cos\theta}\right);$$

$$\rho_6(\theta) = \sqrt{C^2 + R^2 - 2CR\cos\theta};$$

$OM_9$ is taken as a polar axis, a polar diameter corresponding to any position of the curve arc $S_{89}$ is $OP_8 = \rho_8(\theta)$, and an included angle between the polar diameter $OP_8$ and the polar axis $OM_9$ is a polar angle $\varepsilon_8(\theta)$, which satisfies:

$$\varepsilon_8(\theta) = \varphi_1 + 4\beta + \varphi_2 + \varphi_3 + \varphi_4 + \varphi_5 + \varphi_6 + \varphi_7 + \varphi_8 - \theta_0 -$$

$$2\arctan\left[\tan\left(\frac{\varphi'_1+3\beta+\varphi'_2+\varphi'_3+\varphi'_4+\varphi'_5+\varphi'_6+\varphi'_7+\varphi'_8+\theta}{2} - \right.\right.$$

$$\left.\left. a\tan\left(K_d\tan\left(\frac{\theta_0}{2}\right)\right)\right)/K_d\right] + \arctan\left(\frac{R\sin(\beta-\theta)}{C-R\cos(\beta-\theta)}\right);$$

$$\rho_8(\theta) = \sqrt{C^2 + R^2 - 2CR\cos(\beta-\theta)}.$$

By defining the four non-circular curve arc equations of $S_{23}$, $S_{45}$, $S_{67}$ and $S_{89}$ of the first screw 210, the first screw 210 can keep engaged with the second screw 220 when rotating with the second screw 220, so that the self-cleaning effect of the first screw 210 and the second screw 220 is improved, the dispersion and mixing effect of materials can be improved, and the production quality is improved.

It should be noted that two endpoints of the curve arc $S_{12}$ are $M_1$ and $M_2$, two endpoints of the curve arc $S_{34}$ are $M_3$ and $M_4$, and so on. The connection point between the curve arc $S_{91}$ and the curve arc $S_{12}$ is $M_1$, the connection point between the curve arc $S_{12}$ and the curve arc $S_{23}$ is $M_2$, and so on.

Specifically, referring to FIGS. 4 to 12, connection points between every two adjacent curve arcs of the second screw 220 is $N_1$, $N_2$, $N_3$, $N_4$, $N_5$, $N_6$, $N_7$, $N_8$ and $N_9$, which respectively correspond to curve arcs $S'_{12}$, $S'_{23}$, $S'_{34}$, $S'_{45}$, $S'_{56}$, $S'_{67}$, $S'_{78}$, $S'_{89}$ and $S'_{91}$, and an auxiliary angle is given as $\theta$, $0 \le \theta \le \beta$;

$O'N_3$ is taken as a polar axis, a polar diameter corresponding to any position of the curve arc $S'_{23}$ is $OP_{2'} = \rho_{2'}(\theta)$, and an included angle between the polar diameter $OP_{2'}$ and the polar axis $ON_3$ is a polar angle $\varepsilon_{2'}(\theta)$, which satisfies:

$$\varepsilon_{2'}(\theta) = \varphi'_1 + \beta + \varphi'_2 - 2a\tan\left[K_d\tan\left(\frac{\varphi_1+\varphi_2+\theta-\theta_0}{2}\right)\right] -$$

$$2a\tan\left(K_d\tan\left(\frac{\theta_0}{2}\right)\right) + \arctan\left(\frac{R\sin(\beta-\theta)}{C-R\cos(\beta-\theta)}\right);$$

$$\rho_{2'}(\theta) = \sqrt{C^2 + R^2 - 2CR\cos(\beta-\theta)};$$

$O'N_4$ is taken as a polar axis, a polar diameter corresponding to any position of the curve arc $S'_{45}$ is $OP_{4'} = \rho_{4'}(\theta)$, and an included angle between the polar diameter $OP_{4'}$ and the polar axis $ON_4$ is a polar angle $\varepsilon_{4'}(\theta)$, which satisfies:

$$\varepsilon_{4'}(\theta) = 2a\tan\left(K_d\tan\left(\frac{\varphi_1+\varphi_2+\beta+\varphi_3+\theta-\theta_0}{2}\right)\right) +$$

$$2a\tan\left(K_d\tan\left(\frac{\theta_0}{2}\right)\right) - \varphi'_1 - \beta - \varphi'_2 - \varphi'_3 + \arctan\left(\frac{R\sin\theta}{C-R\cos\theta}\right);$$

$$\rho_{4'}(\theta) = \sqrt{C^2 + R^2 - 2CR\cos\theta};$$

$O'N_6$ is taken as a polar axis, a polar diameter corresponding to any position of the curve arc $S'_{67}$ is $OP_{6'} = \rho_{6'}(\theta)$, and an included angle between the polar diameter $OP_{6'}$ and the polar axis $ON_6$ is a polar angle $\varepsilon_{6'}(\theta)$, which satisfies:

$$\varepsilon_{6'}(\theta) = \varphi'_1 + 3\beta \varphi'_2 + \varphi'_3 + \varphi'_4 + \varphi'_5 + \varphi'_6 -$$

$$2a\tan\left(K_d\tan\left(\frac{\varphi_1+2\beta+\varphi_2+\varphi_3+\varphi_4+\varphi_5+\varphi_6+\theta-\theta_0}{2}\right)\right) -$$

$$2a\tan\left(K_d\tan\left(\frac{\theta_0}{2}\right)\right) + \arctan\left(\frac{R\sin(\beta-\theta)}{C-R\cos(\beta-\theta)}\right);$$

$$\rho_{6'}(\theta) = \sqrt{C^2 + R^2 - 2CR\cos(\beta-\theta)};$$

$O'N_8$ is taken as a polar axis, a polar diameter corresponding to any position of the curve arc $S'_{89}$ is $OP_{8'} = \rho_{8'}(\theta)$, and an included angle between the polar diameter $OP_{8'}$ and the polar axis $ON_7$ is a polar angle $\varepsilon_{8'}(\theta)$, which satisfies:

$$\varepsilon_{8'}(\theta) = 2a\tan\left(K_d\tan\left(\frac{\varphi_1+3\beta+\varphi_2+\varphi_3+\varphi_4+\varphi_5+\varphi_6+\varphi_7+\theta-\theta_0}{2}\right)\right) +$$

$$2a\tan\left(K_d\tan\left(\frac{\theta_0}{2}\right)\right) - \varphi'_1 - \varphi'_2 - \varphi'_3 - \varphi'_4 -$$

-continued $$\varphi'_5 - \varphi'_6 - \varphi'_7 - 3\beta + \arctan\left(\frac{R\sin\theta}{C - R\cos\theta}\right);$$

$$\rho_{8'}(\theta) = \sqrt{C^2 + R^2 - 2CR\cos\theta}.$$

By defining the four non-circular curve arc equations of S'$_{23}$, S'$_{45}$, S'$_{67}$ and S'$_{89}$ of the second screw 220, the second screw 220 can keep engaged with the first screw 210 when rotating with the first screw 210, so that the self-cleaning effect of the first screw 210 and the second screw 220 is improved, the dispersion and mixing effect of materials can be improved, and the production quality is improved.

Figure 2:
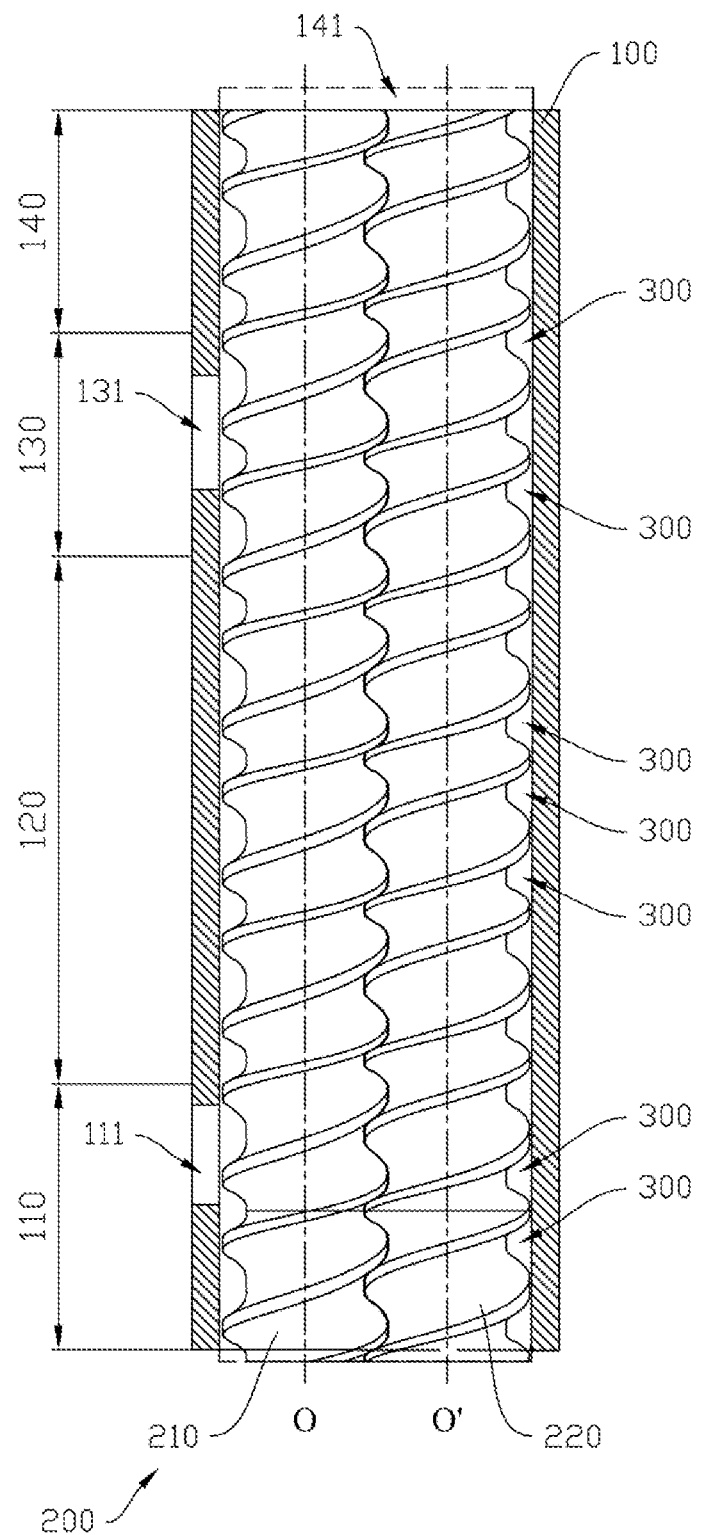
FIG. 2 is a schematic diagram of the twin-screw extrusion device according to an embodiment of a first aspect of the present disclosure.
Figure 3:
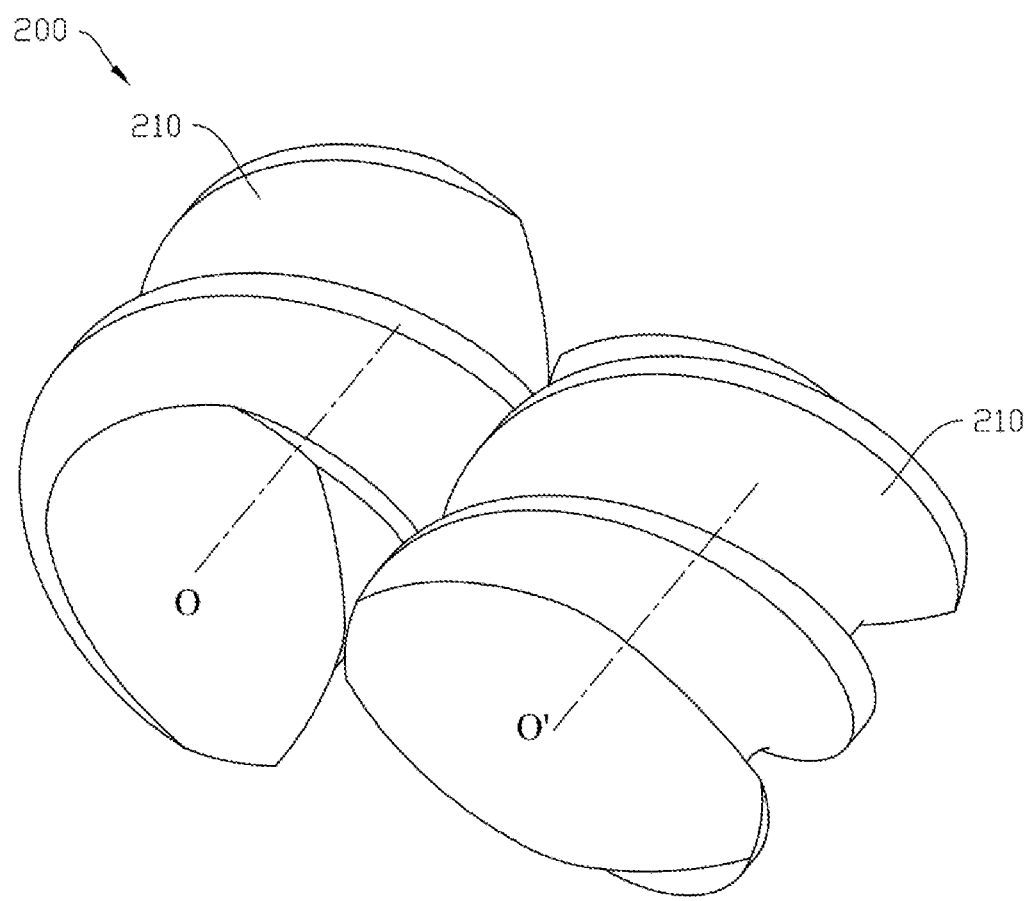
FIG. 3 is a schematic diagram of the engagement of a first screw and a second screw of the twin-screw extrusion device according to an embodiment of a first aspect of the present disclosure.
Figure 4:
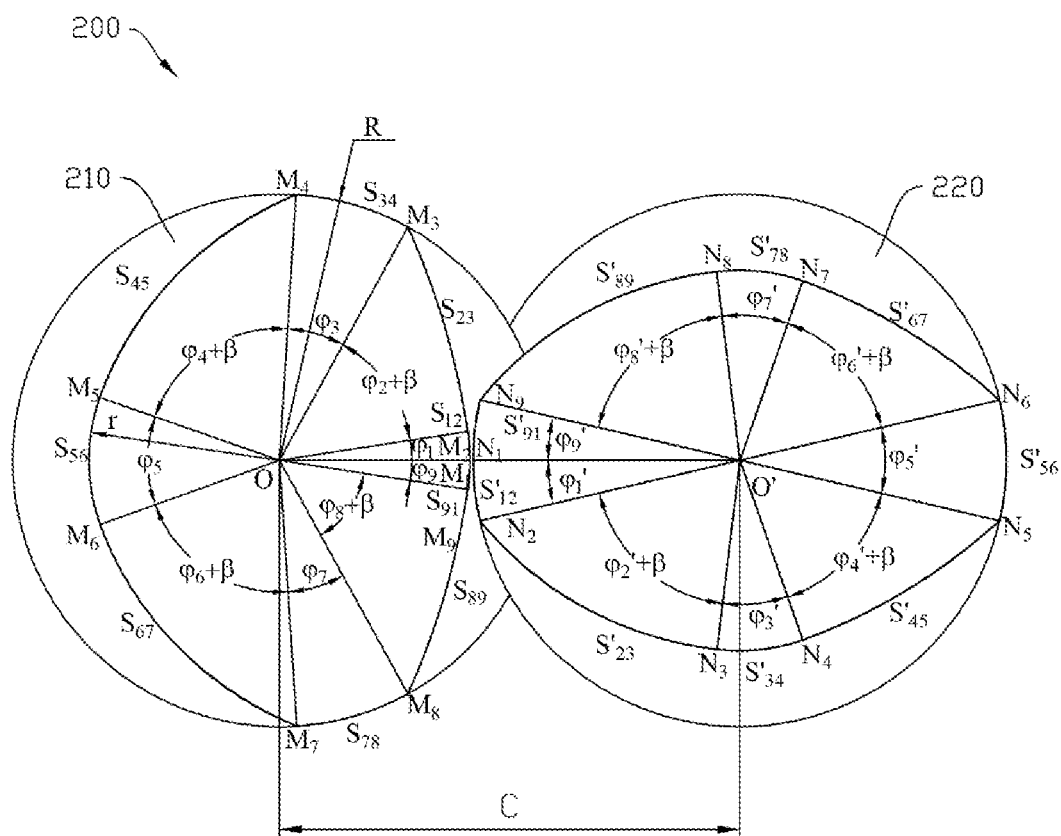
FIG. 4 is a schematic sectional view of the engagement of a first screw and a second screw according to an embodiment of a first aspect of the present disclosure when $\theta_0=0°$, and k=0.2.
Figure 5:
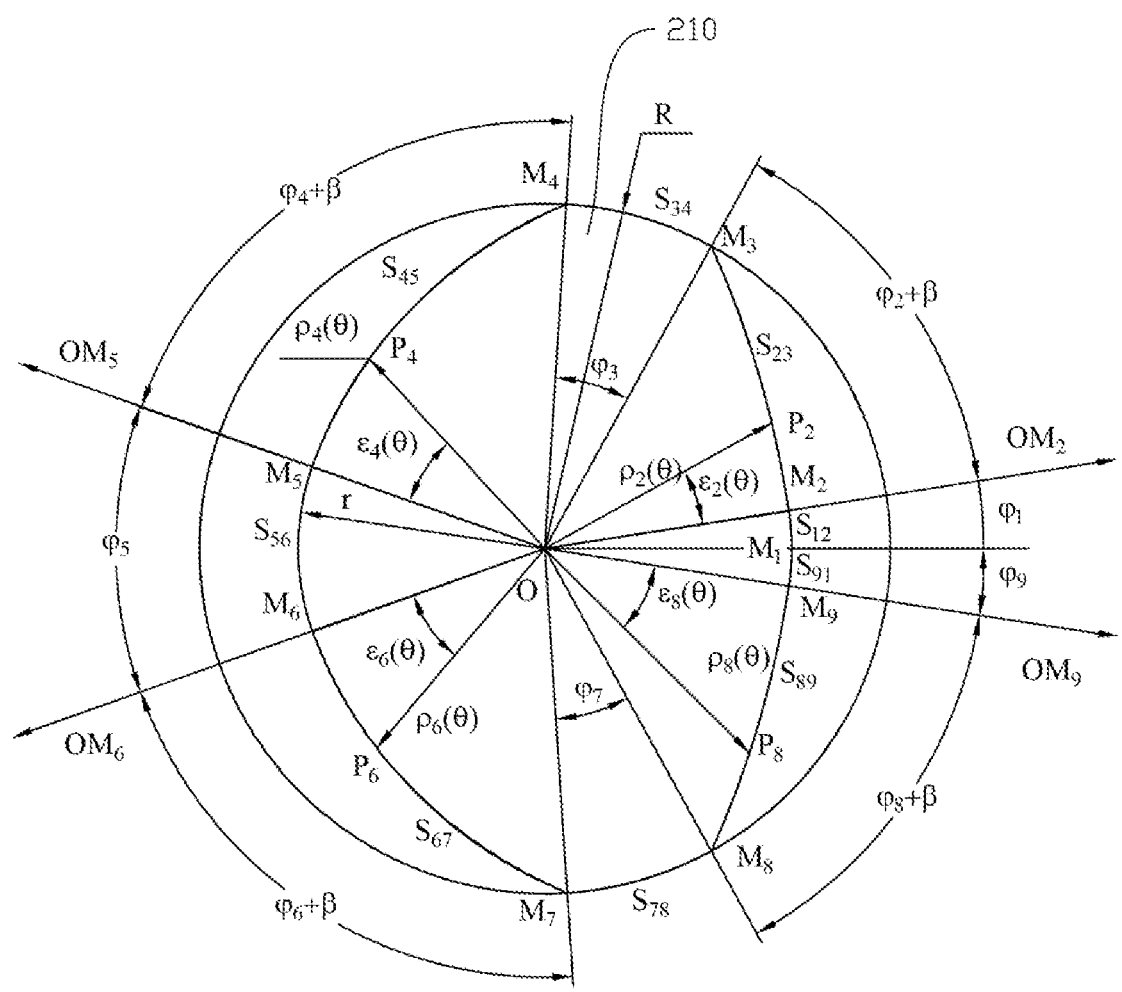
FIG. 5 is a schematic sectional view of a first screw according to an embodiment of a first aspect of the present disclosure when $\theta_0=0°$, and k=0.2.
Figure 6:
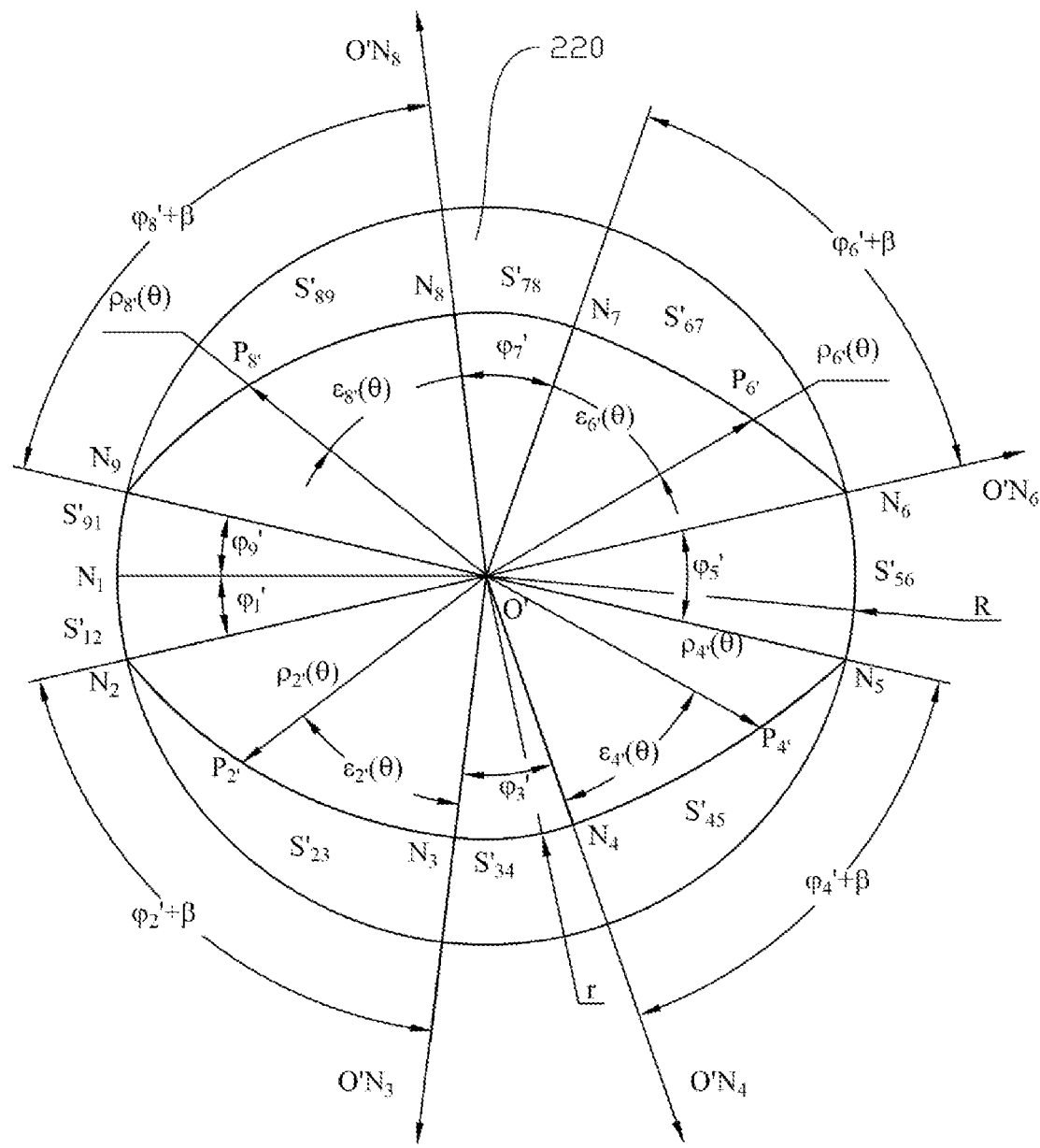
FIG. 6 is a schematic sectional view of a second screw according to an embodiment of a first aspect of the present disclosure when $\theta_0=0°$, and k=0.2.
Figure 7:
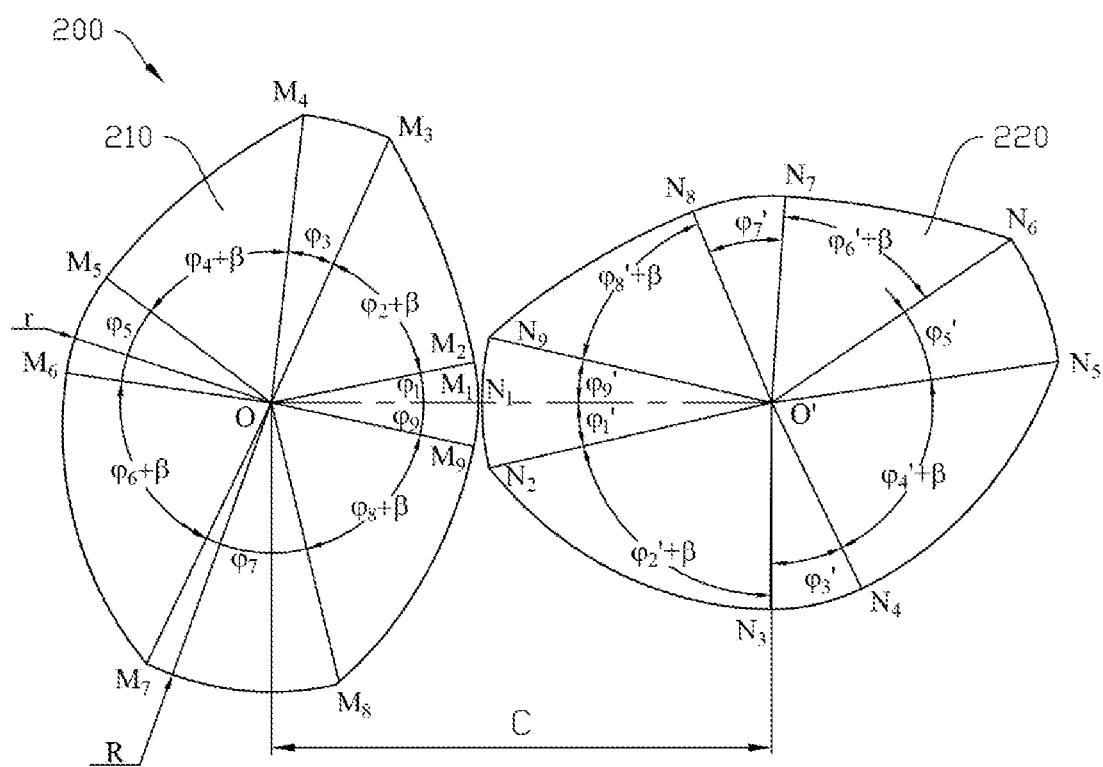
FIG. 7 is a schematic sectional view of the engagement of a first screw and a second screw according to an embodiment of a first aspect of the present disclosure when $\theta_0=63°$, and k=0.2.
Figure 8:
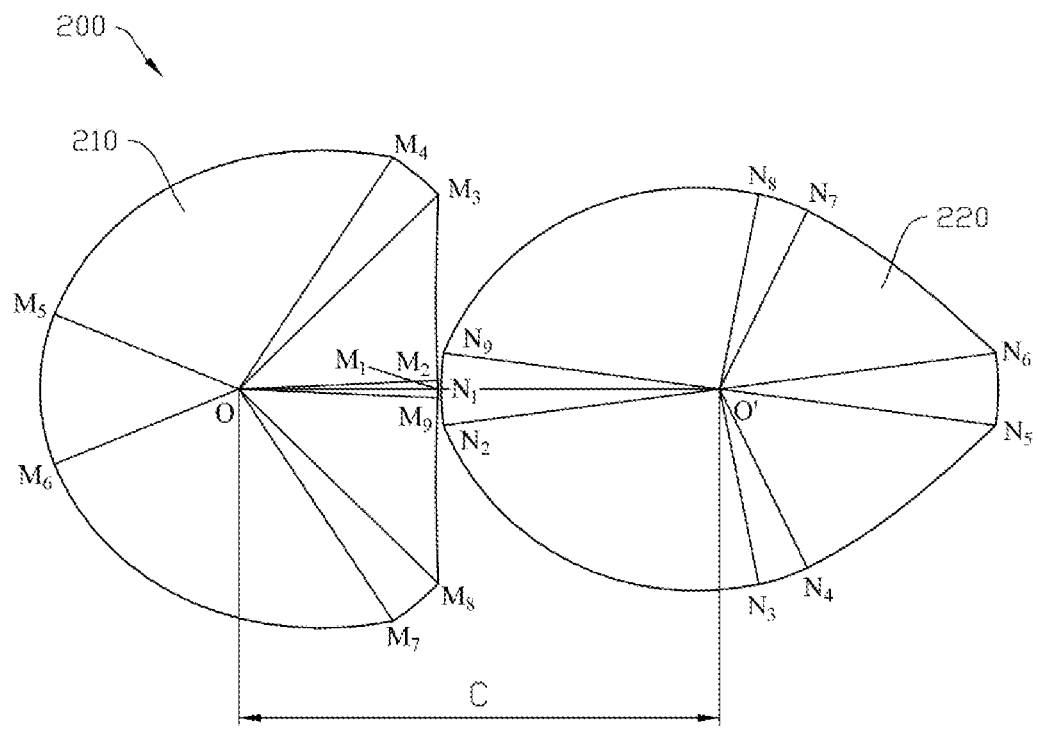
FIG. 8 is a schematic sectional view of the engagement of a first screw and a second screw according to an embodiment of a first aspect of the present disclosure when $\theta_0=0°$, and k=0.5.

It may be understood that, referring to FIGS. 1-2, along an axial direction of the first screw 210, the barrel 100 is sequentially provided with a conveying section 110, a melting section 120, an exhaust section 130 and a mixing extrusion section 140. The conveying section 110 is provided with a feed inlet 111, the exhaust section 130 is provided with an exhaust outlet 131, and the mixing extrusion section 140 is provided with a discharge outlet 141. The materials are input from the feed inlet 111 to enable the materials to enter the conveying section 110, then the first screw 210 and the second screw 220 drive the material conveying to enable the materials to enter the melting section 120 to enable the materials to be melted and to enable the materials to be mixed together, then the materials enter the exhaust section 130 to enable the exhaust gas to be discharged from the exhaust outlet 131, and the materials enter the mixing extrusion section 140 to enable the materials to be output from the discharge outlet 141, so that the melting, mixing and exhaust efficiency is enhanced.

It may be understood that, referring to FIGS. 1-2, both an outer diameter of the first screw 210 and an outer diameter of the second screw 220 are tangent to an inner wall of the barrel 100. By arranging the first screw 210 and the second screw 220 to be tangent to the inner wall of the barrel 100, the extrusion and stretching effects of the materials in the flow channel 300 can be increased, greater disturbance and mixing effects are brought, and the extrusion efficiency of the materials is improved.

Figure 13:
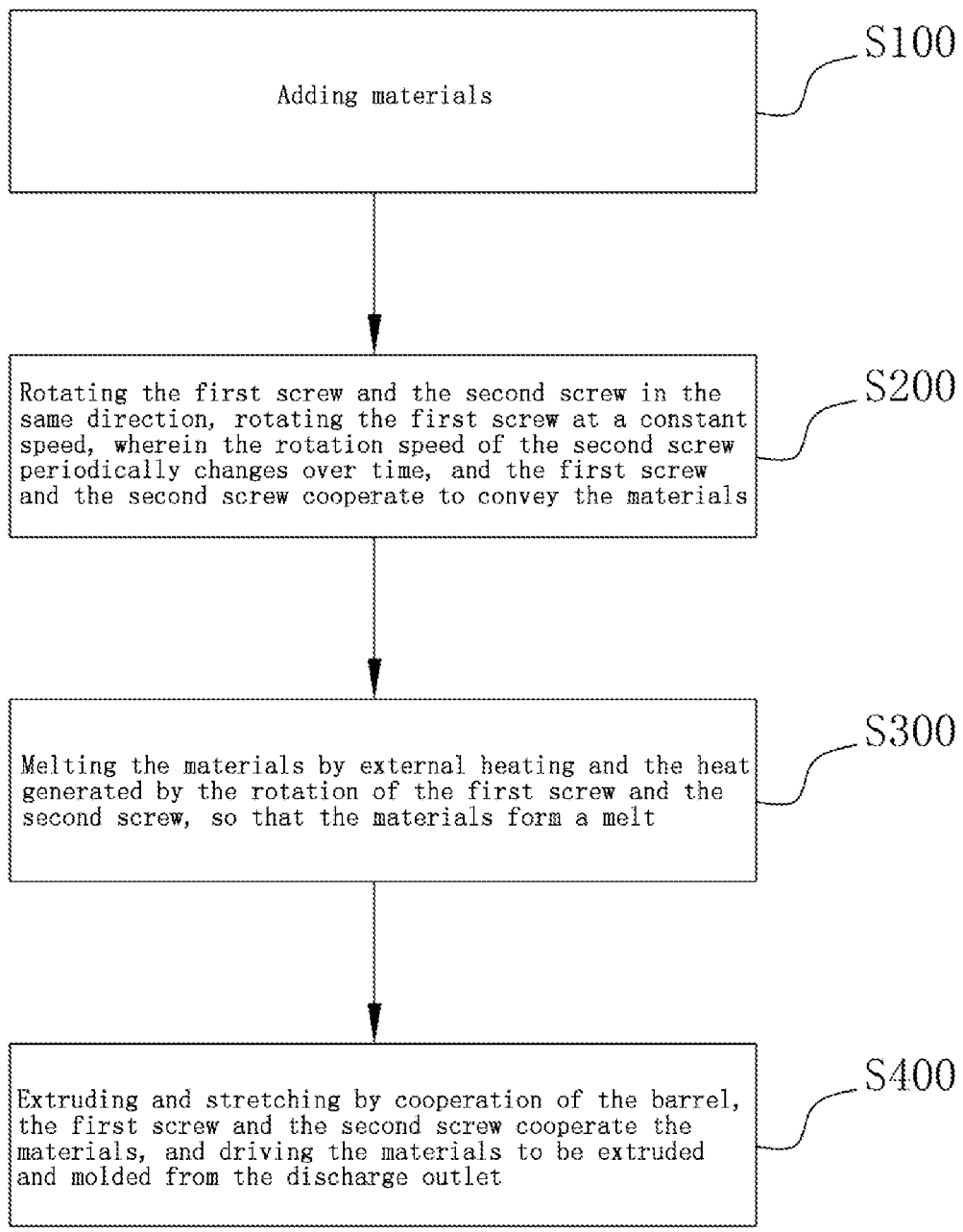
FIG. 13 is a schematic diagram of a processing method for a twin-screw extrusion device according to an embodiment of a second aspect of the present disclosure.

It may be understood that, referring to FIGS. 1-2 and 13, a processing method for a twin-screw extrusion device according to an embodiment of a second aspect of the present disclosure comprising the twin-screw extrusion device according to an embodiment of a first aspect of the present disclosure comprises:

step S100: materials are added;
step S200: the first screw 210 and the second screw 220 rotate in the same direction, the first screw 210 rotates at a constant speed, the rotation speed of the second screw 220 periodically changes over time, and the first screw 210 and the second screw 220 cooperate to convey the materials;
step S300: the materials are melted by external heating and the heat generated by the rotation of the first screw 210 and the second screw 220, so that the materials form a melt; and
step S400: the barrel 100, the first screw 210 and the second screw 220 cooperate to extrude and stretch the materials, and drive the materials to be extruded and molded from the discharge outlet 141.

The materials are fed into the barrel 100, the first screw 210 and the second screw 220 are driven to rotate in the same direction, the first screw 210 rotates at a constant speed, the rotation speed of the second screw 220 changes periodically with time, and the transmission ratio between the first screw 210 and the second screw 220 changes periodically with time, so that the volume in the flow channel 300 changes periodically, and the materials can be driven to be conveyed. The materials are melted by an external heating element and the heat generated by the rotational friction between the first screw 210 and the second screw 220, so that the materials form a melt, and the materials can be extruded and stretched in the flow channel 300 to improve the dispersion and mixing effect of the materials, and then the barrel 100, the first screw 210 and the second screw 220 cooperate to drive the materials to be extruded from the discharge outlet 141. By introducing the extrusion and stretching effects of compression and expansion and re-compression and re-expansion generated by the flow channel 300, the periodic transient disturbance of a velocity field and the stretching and re-orientation effects in the material mixing and dispersing process, the melting and mixing effect and devolatilization efficiency are enhanced, the first screw 210 and the second screw 220 can still be engaged and rotated with each other under the condition of variable rotation speed ratio, and combined with the periodic pulsation effect, the self-cleaning effect is more effectively achieved.

It should be noted that the external heating element may be a heating mechanism such as an electric heating wire or an electric heating coil, which is convenient for heating and melting the materials.

The embodiments of the present disclosure have been described in detail with reference to the accompanying drawings, however, the present disclosure is not limited to the foregoing embodiments. Various changes can be made within the knowledge of those of ordinary skill in the art without departing from the gist of the present disclosure.

What is claimed is:

1. A twin-screw extrusion device, comprising:
   a barrel;
   a twin-screw mechanism comprising a first screw, a second screw and a drive assembly, wherein the first screw and the second screw are both rotatably connected to the barrel, the first screw is engaged with the second screw, the drive assembly comprises a plurality of idler gears and two mutually engaged elliptical gears, one of the elliptical gears is fixedly connected to the first screw, the other elliptical gear is synchronously rotatable with one of the idler gears, the plurality of idler gears are in transmission connection, and a last one of the idler gears is fixedly connected to the second screw, so that the first screw and the second screw are rotatable in a same direction;
   wherein the first screw is rotatable at a constant speed, a rotation speed of the first screw is $\omega_1 = N$, an eccentricity of each of the elliptical gears is k, $0 < k < 0.8$, an included angle between a connecting line of the first screw and the second screw and a long axis of each of the elliptical gears is $\varphi$, and a rotation speed of the second screw is $\omega_2$, satisfying $$\omega_2 = \frac{(1-k^2)N}{1 - 2k\cos\varphi + k^2}.$$

2. The twin-screw extrusion device according to claim 1, wherein an outer diameter of the first screw and the second screw is D, an outer radius of the first screw and the second screw is R, an inner diameter of the first screw and the second screw is d, and an inner radius of the first screw and the second screw is r;

a center distance between the first screw and the second screw is C, and $$C = R + r = \frac{(D+d)}{2};$$

an engaged angle of the first screw and the second screw is β, and $$\beta = \arccos\left(\frac{C}{D}\right);$$

a section of the first screw is formed by connecting curve arcs $S_{12}$, $S_{23}$, $S_{34}$, $S_{45}$, $S_{56}$, $S_{67}$, $S_{78}$, $S_{89}$ and $S_{91}$, and corresponding central angles are $\varphi_1$, $\varphi_2+\beta$, $\varphi_3$, $\varphi_4+\beta$, $\varphi_5$, $\varphi_6+\beta$, $\varphi_7$, $\varphi_8+\beta$ and $\varphi_9$; a section of the second screw is formed by $S'_{12}$, $S'_{23}$, $S'_{34}$, $S'_{45}$, $S'_{56}$, $S'_{67}$, $S'_{78}$, $S'_{89}$ and $S'_{91}$, corresponding central angels are $\varphi'_1$, $\varphi'_2+\beta$, $\varphi'_3$, $\varphi'_4+\beta$, $\varphi'_5$, $\varphi'_6+\beta$, $\varphi'_7$, $\varphi'_8+\beta$ and $\varphi'_9$, a rotation center of the first screw is O, and a rotation center of the second screw is O';

$S_{12}$, $S_{56}$ and $S_{91}$ are a root circle arc with O as a circle center and r as a radius; $S_{34}$ and $S_{78}$ are a top circle arc with O as a circle center and r as a radius; $S'_{12}$, $S'_{56}$ and $S'_{91}$ are a top circle arc with O' as a circle center and R as a radius; $S'_{34}$ and $S'_{78}$ are a root circle arc with O' as a circle center and r as a radius;

an initial phase angle is $\theta_0$, $0 \leq \theta_0 \leq 360°$, and $K_d = (1+k)/(1-k)$;

the central angels satisfy:

$$\varphi'_1 = 2a\tan\left(K_d\tan\left(\frac{\varphi_1-\theta_0}{2}\right)\right) + 2a\tan\left(K_d\tan\left(\frac{\theta_0}{2}\right)\right);$$

$$\varphi'_1 + \beta = 2a\tan\left(K_d\tan\left(\frac{\varphi_1+\varphi_2-\theta_0}{2}\right)\right) + 2a\tan\left(K_d\tan\left(\frac{\theta_0}{2}\right)\right);$$

$$\varphi'_1 + \beta + \varphi'_2 = 2a\tan\left(K_d\tan\left(\frac{\varphi_1+\varphi_2+\beta-\theta_0}{2}\right)\right) + 2a\tan\left(K_d\tan\left(\frac{\theta_0}{2}\right)\right);$$

$$\varphi'_1 + \beta + \varphi'_2 + \varphi'_3 =$$
$$2a\tan\left(K_d\tan\left(\frac{\varphi_1+\varphi_2+\beta+\varphi_3-\theta_0}{2}\right)\right) + 2a\tan\left(K_d\tan\left(\frac{\theta_0}{2}\right)\right);$$

$$\varphi'_1 + \beta + \varphi'_2 + \varphi'_3 + \varphi'_4 =$$
$$2a\tan\left(K_d\tan\left(\frac{\varphi_1+\varphi_2+2\beta+\varphi_3-\theta_0}{2}\right)\right) + 2a\tan\left(K_d\tan\left(\frac{\theta_0}{2}\right)\right);$$

$$\varphi'_1 + 2\beta + \varphi'_2 + \varphi'_3 + \varphi'_4 =$$
$$2a\tan\left(K_d\tan\left(\frac{\varphi_1+\varphi_2+2\beta+\varphi_3+\varphi_4-\theta_0}{2}\right)\right) + 2a\tan\left(K_d\tan\left(\frac{\theta_0}{2}\right)\right);$$

$$\varphi'_1 + 2\beta + \varphi'_2 + \varphi'_3 + \varphi'_4 + \varphi'_5 =$$
$$2a\tan\left(K_d\tan\left(\frac{\varphi_1+\varphi_2+2\beta+\varphi_3+\varphi_4+\varphi_5-\theta_0}{2}\right)\right) + 2a\tan\left(K_d\tan\left(\frac{\theta_0}{2}\right)\right);$$

$$\varphi'_1 + 3\beta + \varphi'_2 + \varphi'_3 + \varphi'_4 + \varphi'_5 =$$
$$2a\tan\left(K_d\tan\left(\frac{\varphi_1+\varphi_2+2\beta+\varphi_3+\varphi_4+\varphi_5+\varphi_6-\theta_0}{2}\right)\right) +$$
$$2a\tan\left(K_d\tan\left(\frac{\theta_0}{2}\right)\right);$$

$$\varphi'_1 + 3\beta + \varphi'_2 + \varphi'_3 + \varphi'_4 + \varphi'_5 + \varphi'_6 =$$
$$2a\tan\left(K_d\tan\left(\frac{\varphi_1+\varphi_2+3\beta+\varphi_3+\varphi_4+\varphi_5+\varphi_6-\theta_0}{2}\right)\right) +$$
$$2a\tan\left(K_d\tan\left(\frac{\theta_0}{2}\right)\right);$$

$$\varphi'_1 + 3\beta + \varphi'_2 + \varphi'_3 + \varphi'_4 + \varphi'_5 + \varphi'_6 + \varphi'_7 =$$
$$2a\tan\left(K_d\tan\left(\frac{\varphi_1+\varphi_2+3\beta+\varphi_3+\varphi_4+\varphi_5+\varphi_6+\varphi_7-\theta_0}{2}\right)\right) +$$
$$2a\tan\left(K_d\tan\left(\frac{\theta_0}{2}\right)\right);$$

$$\varphi'_1 + 3\beta + \varphi'_2 + \varphi'_3 + \varphi'_4 + \varphi'_5 + \varphi'_6 + \varphi'_7 + \varphi'_8 =$$
$$2a\tan\left(K_d\tan\left(\frac{\varphi_1+\varphi_2+4\beta+\varphi_3+\varphi_4+\varphi_5+\varphi_6+\varphi_7-\theta_0}{2}\right)\right) +$$
$$2a\tan\left(K_d\tan\left(\frac{\theta_0}{2}\right)\right);$$

$$\varphi'_1 + 4\beta + \varphi'_2 + \varphi'_3 + \varphi'_4 + \varphi'_5 + \varphi'_6 + \varphi'_7 + \varphi'_8 =$$
$$2a\tan\left(K_d\tan\left(\frac{\varphi_1+\varphi_2+4\beta+\varphi_3+\varphi_4+\varphi_5+\varphi_6+\varphi_7+\varphi_8-\theta_0}{2}\right)\right) +$$
$$2a\tan\left(K_d\tan\left(\frac{\theta_0}{2}\right)\right);$$

$$\varphi'_1 + 4\beta + \varphi'_2 + \varphi'_3 + \varphi'_4 + \varphi'_5 + \varphi'_6 + \varphi'_7 + \varphi'_8 + \varphi'_9 =$$
$$2a\tan\left(K_d\tan\left(\frac{\varphi_1+\varphi_2+4\beta+\varphi_3+\varphi_4+\varphi_5+\varphi_6+\varphi_7+\varphi_8+\varphi_9-\theta_0}{2}\right)\right) +$$
$$2a\tan\left(K_d\tan\left(\frac{\theta_0}{2}\right)\right);$$

$$\sum_{i=1}^{9}\varphi_i + 4\beta = 360;$$

$$\sum_{i=1}^{9}\varphi'_i + 4\beta = 360.$$

3. The twin-screw extrusion device according to claim 2, wherein connection points between every two adjacent curve arcs of the first screw is $M_1$, $M_2$, $M_3$, $M_4$, $M_5$, $M_6$, $M_7$, $M_8$ and $M_9$, which respectively correspond to curve arcs $S_{12}$, $S_{23}$, $S_{34}$, $S_{45}$, $S_{56}$, $S_{67}$, $S_{78}$, $S_{89}$ and $S_{91}$, and an auxiliary angle is given as θ, $0 \leq \theta \leq \beta$;

$OM_2$ is taken as a polar axis, a polar diameter corresponding to any position of the curve arc $S_{23}$ is $OP_2 = \rho_2(\theta)$, and an included angle between the polar diameter $OP_2$ and the polar axis $OM_2$ is a polar angle $\varepsilon_2(\theta)$, which satisfies:

$$\varepsilon_2(\theta) = 2\arctan\left[\tan\left(\frac{\varphi'_1+\theta}{2} - a\tan\left(K_d\tan\left(\frac{\theta_0}{2}\right)\right)\right)/K_d\right] +$$
$$\theta_0 - \varphi_1 + \arctan\left(\frac{R\sin\theta}{C - R\cos\theta}\right);$$

$$\rho_2(\theta) = \sqrt{C^2 + R^2 - 2CR\cos\theta};$$

$OM_5$ is taken as a polar axis, a polar diameter corresponding to any position of the curve arc $S_{45}$ is $OP_5 = \rho_4(\theta)$, and an included angle between the polar diameter $OP_5$ and the polar axis $OM_5$ is a polar angle $\varepsilon_4(\theta)$, which satisfies:

$$\varepsilon_4(\theta) = \varphi_1 + \varphi_2 + \varphi_3 + \varphi_4 + 2\beta - \theta_0 -$$
$$2\arctan\left[\tan\left(\frac{\varphi_1' + \beta + \varphi_2' + \varphi_3' + \varphi_4' + \theta}{2} - a\tan\left(K_d\tan\left(\frac{\theta_0}{2}\right)\right)\right)\bigg/K_d\right] +$$
$$\arctan\left(\frac{R\sin(\beta-\theta)}{C - R\cos(\beta-\theta)}\right);$$
$$\rho_4(\theta) = \sqrt{C^2 + R^2 - 2CR\cos(\beta-\theta)};$$

$OM_6$ is taken as a polar axis, a polar diameter corresponding to any position of the curve arc $S_{67}$ is $OP_6 = \rho_6(\theta)$, and an included angle between the polar diameter $OP_6$ and the polar axis $OM_6$ is a polar angle $\varepsilon_6(\theta)$, which satisfies:

$$\varepsilon_6(\theta) =$$
$$2\arctan\left[\tan\left(\frac{\varphi_1' + 2\beta + \varphi_2' + \varphi_3' + \varphi_4' + \varphi_4' + \varphi_5' + \theta}{2} - a\tan\left(K_d\tan\left(\frac{\theta_0}{2}\right)\right)\right)\bigg/\right.$$
$$\left. K_d\right] + \theta_0 - \varphi_1 - \varphi_2 - \varphi_3 - \varphi_4 - \varphi_5 - 2\beta + \arctan\left(\frac{R\sin\theta}{C-R\cos\theta}\right);$$
$$\rho_6(\theta) = \sqrt{C^2 + R^2 - 2CR\cos\theta};$$

$OM_9$ is taken as a polar axis, a polar diameter corresponding to any position of the curve arc $S_{89}$ is $OP_8 = \rho_8(\theta)$, and an included angle between the polar diameter $OP_8$ and the polar axis $OM_9$ is a polar angle $\varepsilon_8(\theta)$, which satisfies:

$$\varepsilon_8(\theta) = \varphi_1 + 4\beta + \varphi_2 + \varphi_3 + \varphi_4 + \varphi_5 + \varphi_6 + \varphi_7 + \varphi_8 - \theta_0 -$$
$$2\arctan\left[\tan\left(\frac{\varphi_1' + 3\beta + \varphi_2' + \varphi_3' + \varphi_4' + \varphi_4' + \varphi_5' + \varphi_6' + \varphi_7' + \varphi_8' + \theta}{2} -\right.\right.$$
$$\left.\left. a\tan\left(K_d\tan\left(\frac{\theta_0}{2}\right)\right)\right)\bigg/K_d\right] + \arctan\left(\frac{R\sin(\beta-\theta)}{C-R\cos(\beta-\theta)}\right);$$
$$\rho_8(\theta) = \sqrt{C^2 + R^2 - 2CR\cos(\beta-\theta)}.$$

4. The twin-screw extrusion device according to claim 2, wherein connection points between every two adjacent curve arcs of the second screw are $N_1$, $N_2$, $N_3$, $N_4$, $N_5$, $N_6$, $N_7$, $N_8$ and $N_9$, which respectively correspond to curve arcs $S'_{12}$, $S'_{23}$, $S'_{34}$, $S'_{45}$, $S'_{56}$, $S'_{67}$, $S'_{78}$, $S'_{89}$ and $S'_{91}$, and an auxiliary angle is given as $\theta$, $0 \leq \theta \leq B$;

$O'N_3$ is taken as a polar axis, a polar diameter corresponding to any position of the curve arc $S'_{23}$ is $OP_{2'} = \rho_{2'}(\theta)$, and an included angle between the polar diameter $OP_{2'}$ and the polar axis $ON_3$ is a polar angle $\varepsilon_{2'}(\theta)$, which satisfies:

$$\varepsilon_{2'}(\theta) =$$
$$\varphi_1' + \beta + \varphi_2' - 2a\tan\left[K_d\tan\left(\frac{\varphi_1 + \varphi_2 + \theta - \theta_0}{2}\right) - 2a\tan\left(K_d\tan\left(\frac{\theta_0}{2}\right)\right)\right] +$$
$$\arctan\left(\frac{R\sin(\beta-\theta)}{C-R\cos(\beta-\theta)}\right);$$

-continued
$$\rho_{2'}(\theta) = \sqrt{C^2 + R^2 - 2CR\cos(\beta-\theta)};$$

$O'N_4$ is taken as a polar axis, a polar diameter corresponding to any position of the curve arc $S'_{45}$ is $OP_{4'} = \rho_{4'}(\theta)$, and an included angle between the polar diameter $OP_{4'}$ and the polar axis $ON_4$ is a polar angle $\varepsilon_{4'}(\theta)$, which satisfies:

$$\varepsilon_{4'}(\theta) = 2a\tan\left(K_d\tan\left(\frac{\varphi_1 + \varphi_2 + \beta + \varphi_3 + \theta - \theta_0}{2}\right)\right) +$$
$$2a\tan\left(K_d\tan\left(\frac{\theta_0}{2}\right)\right) - \varphi_1' - \beta - \varphi_2' - \varphi_3' + \arctan\left(\frac{R\sin\theta}{C-R\cos\theta}\right);$$
$$\rho_{4'}(\theta) = \sqrt{C^2 + R^2 - 2CR\cos\theta};$$

$O'N_6$ is taken as a polar axis, a polar diameter corresponding to any position of the curve arc $S'_{67}$ is $OP_{6'} = \rho_{6'}(\theta)$, and an included angle between the polar diameter $OP_{6'}$ and the polar axis $ON_6$ is a polar angle $\varepsilon_{6'}(\theta)$, which satisfies:

$$\varepsilon_{6'}(\theta) = \varphi_1' + +3\beta\varphi_2' + \varphi_3' + \varphi_4' + \varphi_5' + \varphi_6' -$$
$$2a\tan\left(K_d\tan\left(\frac{\varphi_1 + 2\beta + \varphi_2 + \varphi_3 + \varphi_4 + \varphi_5 + \varphi_6 + \theta - \theta_0}{2}\right)\right) -$$
$$2a\tan\left(K_d\tan\left(\frac{\theta_0}{2}\right)\right) + \arctan\left(\frac{R\sin(\beta-\theta)}{C-R\cos(\beta-\theta)}\right);$$
$$\rho_{6'}(\theta) = \sqrt{C^2 + R^2 - 2CR\cos(\beta-\theta)};$$

$O'N_8$ is taken as a polar axis, a polar diameter corresponding to any position of the curve arc $S'_{89}$ is $OP_{8'} = \rho_{8'}(\theta)$, and an included angle between the polar diameter $OP_{8'}$ and the polar axis $ON_7$ is a polar angle $\varepsilon_{8'}(\theta)$, which satisfies:

$$\varepsilon_{8'}(\theta) = 2a\tan\left(K_d\tan\left(\frac{\varphi_1 + 3\beta + \varphi_2 + \varphi_3 + \varphi_4 + \varphi_5 + \varphi_6 + \varphi_7 + \theta - \theta_0}{2}\right)\right) +$$
$$2a\tan\left(K_d\tan\left(\frac{\theta_0}{2}\right)\right) - \varphi_1' - \varphi_2' - \varphi_3' - \varphi_4' -$$
$$\varphi_5' - \varphi_6' - \varphi_7' - 3\beta + \arctan\left(\frac{R\sin\theta}{C-R\cos\theta}\right);$$
$$\rho_{8'}(\theta) = \sqrt{C^2 + R^2 - 2CR\cos\theta}.$$

5. The twin-screw extrusion device according to claim 1, wherein, along an axial direction of the first screw, the barrel is sequentially provided with a conveying section, a melting section, an exhaust section and a mixing extrusion section, the conveying section is provided with a feed inlet, the exhaust section is provided with an exhaust outlet, and the mixing extrusion section is provided with a discharge outlet.

6. The twin-screw extrusion device according to claim 1, wherein both an outer diameter of the first screw and an outer diameter of the second screw are tangent to an inner wall of the barrel.

\* \* \* \* \*